(12) United States Patent
Kaczmarczyk et al.

(10) Patent No.: US 9,671,974 B2
(45) Date of Patent: Jun. 6, 2017

(54) STORAGE SYSTEM AND DEDUPLICATION CONTROL METHOD THEREFOR

(75) Inventors: Michal Kaczmarczyk, Warsaw (PL); Marcin Barczynski, Warsaw (PL); Wojciech Kilian, Warsaw (PL); Cezary Dubnicki, Warsaw (PL)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 13/822,073

(22) PCT Filed: Sep. 10, 2012

(86) PCT No.: PCT/JP2012/005700
§ 371 (c)(1),
(2), (4) Date: Aug. 23, 2013

(87) PCT Pub. No.: WO2013/038632
PCT Pub. Date: Mar. 21, 2013

(65) Prior Publication Data
US 2014/0025917 A1    Jan. 23, 2014

Related U.S. Application Data

(60) Provisional application No. 61/535,734, filed on Sep. 16, 2011.

(51) Int. Cl.
*G06F 3/06* (2006.01)
*G06F 11/14* (2006.01)
*G06F 17/30* (2006.01)

(52) U.S. Cl.
CPC .......... *G06F 3/0644* (2013.01); *G06F 3/0608* (2013.01); *G06F 3/0673* (2013.01);
(Continued)

(58) Field of Classification Search
CPC ............. G06F 11/1448; G06F 11/1453; G06F 11/1469; G06F 17/30159
See application file for complete search history.

(56) References Cited

U.S. PATENT DOCUMENTS

| 7,567,188 B1* | 7/2009 | Anglin et al. | 341/63 |
| 2009/0055593 A1* | 2/2009 | Satoyama | G06F 3/0608 711/134 |

(Continued)

FOREIGN PATENT DOCUMENTS

| JP | 08-115238 A | 5/1996 |
| JP | 2005-235171 A | 9/2005 |

(Continued)

OTHER PUBLICATIONS

Communication dated Apr. 9, 2015 from the European Patent Office in counterpart European Application No. 12832499.3.

(Continued)

*Primary Examiner* — Charles Rones
*Assistant Examiner* — Tian-Pong Chang
(74) *Attorney, Agent, or Firm* — Sughrue Mion, PLLC

(57) ABSTRACT

A storage system according to the present invention includes: a block detecting means for checking whether respective block data obtained by division are already stored in a storage device; and a data writing means for storing the respective block data obtained by division with duplicated storage eliminated into the storage device. The block detecting means detects a share rate representing a rate of a shared portion between a plurality of consecutive block data configuring a predetermined range in write target data among the block data obtained by division and a plurality of block data in a predetermined range already stored consecutively in the storage device. The data writing means, depending on the detected share rate, newly stores the block data obtained by division, into the storage device.

10 Claims, 22 Drawing Sheets

(52) U.S. Cl.
CPC .... *G06F 11/1448* (2013.01); *G06F 17/30159*
(2013.01); *G06F 3/064* (2013.01); *G06F*
*11/1453* (2013.01); *G06F 11/1469* (2013.01);
*G06F 2211/104* (2013.01)

(56) References Cited

U.S. PATENT DOCUMENTS

| | | |
|---|---|---|
| 2010/0082636 A1 | 4/2010 | Kruus et al. |
| 2010/0205389 A1 | 8/2010 | Kishi |
| 2011/0161607 A1* | 6/2011 | Nomura ............... G06F 3/0613 711/162 |
| 2011/0252217 A1 | 10/2011 | Lillibridge et al. |
| 2012/0036113 A1* | 2/2012 | Lillibridge et al. .......... 707/694 |
| 2012/0198152 A1* | 8/2012 | Terry et al. ................... 711/114 |
| 2012/0233417 A1* | 9/2012 | Kalach et al. ................ 711/162 |

FOREIGN PATENT DOCUMENTS

| | | |
|---|---|---|
| WO | 2006/094367 A1 | 9/2006 |
| WO | 2008/070484 A2 | 6/2008 |
| WO | 2011/099098 A1 | 8/2011 |
| WO | 2012/117658 A1 | 9/2012 |

OTHER PUBLICATIONS

Kaczmarczyk et al: "Reducing impact of data fragmentation caused by in-line deduplication", Proceedings of the 5th Annual International Systems and Storage Conference on, Systor '12, Jan. 1, 2012 (Jan. 1, 2012), pp. 1-12, XP055179767, New York, New York, USA DOI: 10.1145/2367589.2367600 ISBN: 978-1-45-031448-0.

\* cited by examiner

Fig. 13

| data set name | number of backups | avg. one backup size | avg. duplicate blocks* | avg. internal duplicate blocks |
|---|---|---|---|---|
| Development project | 7 | 13.74GB | 96% | 18% |
| Issue repository | 7 | 18.36GB | 86% | 23% |
| Wiki | 8 | 8.75GB | 98% | 18% |
| General file server | 14 | 77.59GB | 78% | 16% |

Fig. 14

| data set name | B/W before defragmentation | B/W after defragmentation | % of blocks rewritten | write time increase |
|---|---|---|---|---|
| Development project | 85.43% | 92.57% | 1.16% | 18% |
| Issue repository | 46.12% | 95.58% | 2.61% | 23% |
| Wiki | 88.34% | 95.48% | 1.41% | 18% |
| General file server | 88.34% | 95.77% | 0.52% | 16% |

Fig. 18

| Aspect | Off-line duplicate elimination | On-line CBR | Off-line CBR |
|---|---|---|---|
| duplicated stream write bandwidth | low | high | high |
| read bandwidth | maximal | close to maximal | low after backup, later close to maximal |
| additional disk space consumption | low (with staging) | low (not more than (5%)) | low (with staging) |
| additional disk bandwidth and spindle consumptio | high (write all duplicates and remove) | high (avoids writing duplicates except for 5% rewites) | medium (additional reads) |

STORAGE SYSTEM AND DEDUPLICATION CONTROL METHOD THEREFOR

CROSS REFERENCE TO RELATED APPLICATIONS

This application is a National Stage of International Application No. PCT/JP2012/005700, filed on Sep. 10, 2012, which claims priority from U.S. Patent Provisional Application No. 61/535,734, filed Sep. 16, 2011, the contents of all of which are incorporated herein by reference in their entirety.

TECHNICAL FIELD

The present invention relates to a storage system, more specifically, a storage system that eliminates duplicated storage of data of the same content.

BACKGROUND ART

In recent years, various kinds of information are digitalized with development and spread of computers. As a device for storing such digital data, there is a storage device such as a magnetic tape and a magnetic disk. Because the amount of data that should be stored increases day by day and reaches a huge amount, a mass storage system is required. Moreover, as well as reduction of the cost spent for a storage device, reliability is also required. In addition, it is also required that data can be easily retrieved later. As a result, a storage system that can automatically realize increase of storage capacity and performance, eliminates duplicated storage to reduce a storage cost and has high redundancy is desired.

Under such a circumstance, in recent years, as shown in PTL 1, a content-addressable storage system has been developed. This content-addressable storage system distributes and stores data into a plurality of storage devices and, by a unique content address specified depending on the content of the data, specifies a storage position where the data is stored. Moreover, some of the content-addressable storage systems divide predetermined data into a plurality of fragments and add a fragment as redundant data, and then store these fragments into a plurality of storage devices, respectively.

Later, the content-addressable storage systems as described above can designate a content address to retrieve data, namely, fragments stored in a storage position specified by the content address and restore the predetermined data before being divided from the fragments.

Further, the content address is generated based on a value generated so as to be unique depending on the content of data, for example, a hash value of data. Therefore, in the case of duplicated data, it is possible to refer to data in the same storage location and acquire data of the same content. Consequently, it is unnecessary to store the duplicated data separately, and it is possible to eliminate duplicated recording and reduce the data volume.

CITATION LIST

Patent Literature

PTL 1: Japanese Unexamined Patent Application Publication No. 2005-235171

SUMMARY OF INVENTION

Technical Problem

In a storage system having a function of eliminating duplicated storage as described above, data to be written such as a file is divided into a plurality of block data of a predetermined volume, and stored into the storage device. Thus, by eliminating duplicated storage by the block data, reduction of a data volume is aimed.

However, in a case that some of the plurality of block data configuring the write target data are new block data which are not stored in the storage device, the new block data are stored at the end of a region in which predetermined data are currently stored. Then, in the case of storing new block data every time updating write target data is repeated, a plurality of block data configuring the write target data are stored in a scattered state in an entire storage region in the storage device. Thus, for retrieving data later, it is necessary to scan a huge number of disks in order to retrieve block data scattered in the entire storage device, and consequently, a problem that retrieval performance decreases arises.

Accordingly, an object of the present invention is to solve the abovementioned problem, i.e., a problem of decrease of retrieval performance in a storage system having a duplicated storage elimination function.

Solution to Problem

A storage system according to an exemplary embodiment of the present invention includes:

a data dividing means for dividing write target data into a plurality of block data;

a block detecting means for checking whether the respective block data obtained by division by the data dividing means are already stored in a storage device; and a data writing means for storing the respective block data obtained by division by the data dividing means into the storage device and, when storing other block data of a same content as block data already stored in the storage device, causing to refer to the block data already stored in the storage device as the other block data.

The block detecting means is configured to detect a share rate representing a rate of a shared portion between a plurality of consecutive block data configuring a predetermined range in the write target data among the block data obtained by division by the data dividing means and a plurality of block data in a predetermined range already stored consecutively in the storage device.

The data writing means is configured to, depending on the share rate detected by the block detecting means, newly store the block data obtained by division by the data dividing means, into the storage device.

Further, a program according to another exemplary embodiment of the present invention is a computer program comprising instructions for causing an information processing device to realize:

a data dividing means for dividing write target data into a plurality of block data;

a block detecting means for checking whether the respective block data obtained by division by the data dividing means are already stored in a storage device; and a data writing means for storing the respective block data obtained by division by the data dividing means into the storage device and, when storing other block data of a same content as block data already stored in the storage device, causing to refer to the block data already stored in the storage device as the other block data.

The block detecting means is configured to detect a share rate representing a rate of a shared portion between a plurality of consecutive block data configuring a predetermined range in the write target data among the block data obtained by division by the data dividing means and a plurality of block data in a predetermined range already stored consecutively in the storage device.

The data writing means is configured to, depending on the share rate detected by the block detecting means, newly store the block data obtained by division by the data dividing means, into the storage device.

Further, an information processing method according to another exemplary embodiment of the present invention includes:

dividing write target data into a plurality of block data;

checking whether the respective block data obtained by division are already stored in a storage device; and storing the respective block data obtained by division into the storage device and, when storing other block data of a same content as block data already stored in the storage device, writing data by causing to refer to the block data already stored in the storage device as the other block data.

The information processing method further includes:

after dividing the write target data into the block data, detecting a share rate representing a rate of a shared portion between a plurality of consecutive block data configuring a predetermined range in the write target data among the block data obtained by division and a plurality of block data in a predetermined range already stored consecutively in the storage device; and depending on the detected share rate, newly storing the block data obtained by division, into the storage device.

Advantageous Effects of Invention

With the configurations described above, the present invention can limit decrease of retrieval performance in a storage system having a duplicated storage elimination function.

BRIEF DESCRIPTION OF DRAWINGS

FIG. 13 is a view referred to in the report explained in the second exemplary embodiment of the present invention;

FIG. 14 is a view referred to in the report explained in the second exemplary embodiment of the present invention;

FIG. 18 is a view referred to in the report explained in the second exemplary embodiment of the present invention.

DESCRIPTION OF EMBODIMENTS

First Exemplary Embodiment

Figure 1:
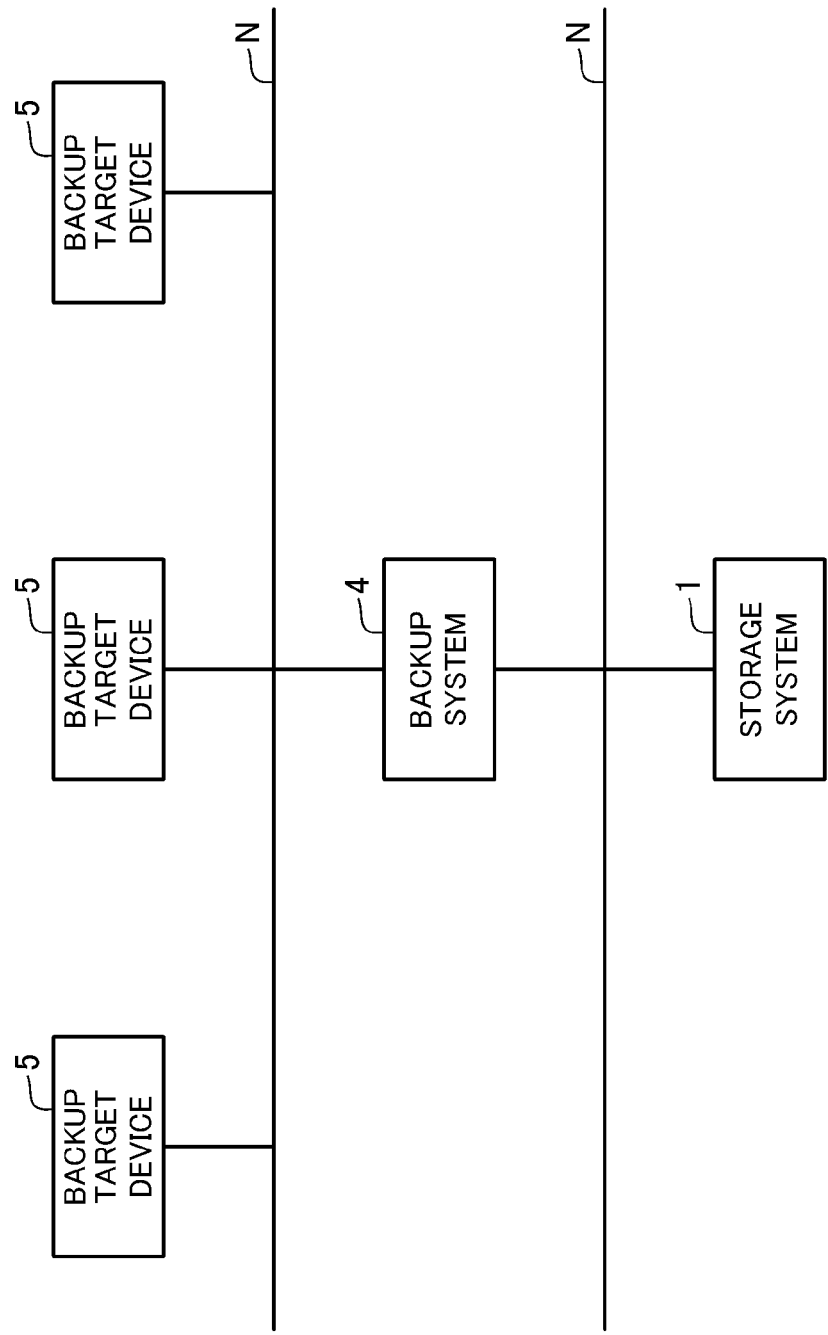
FIG. 1 is a block diagram showing a configuration of a whole system including a storage system according to a first exemplary embodiment of the present invention.
Figure 2:
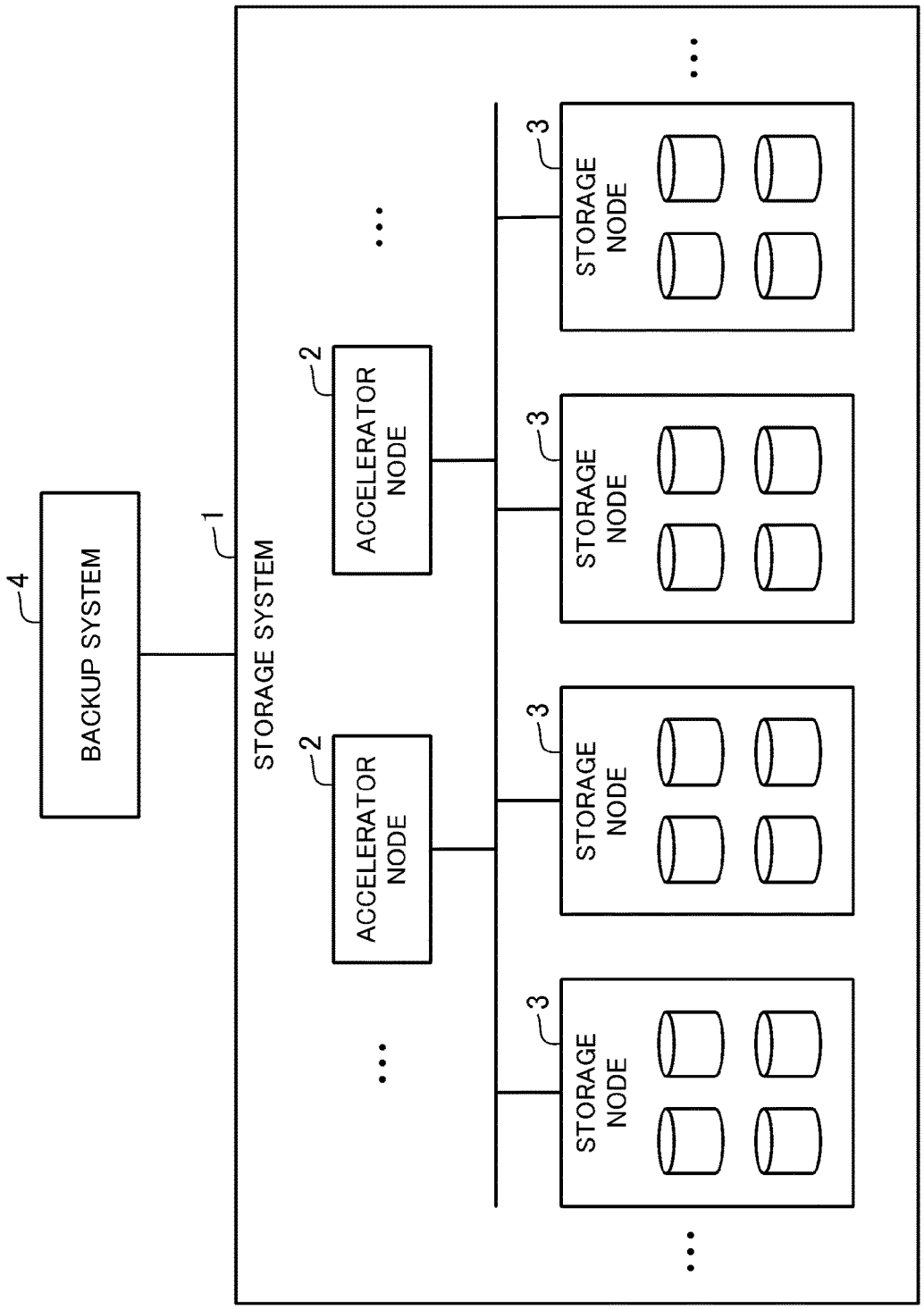
FIG. 2 is a block diagram showing an outline of a configuration of the storage system according to the first exemplary embodiment of the present invention.
Figure 3:
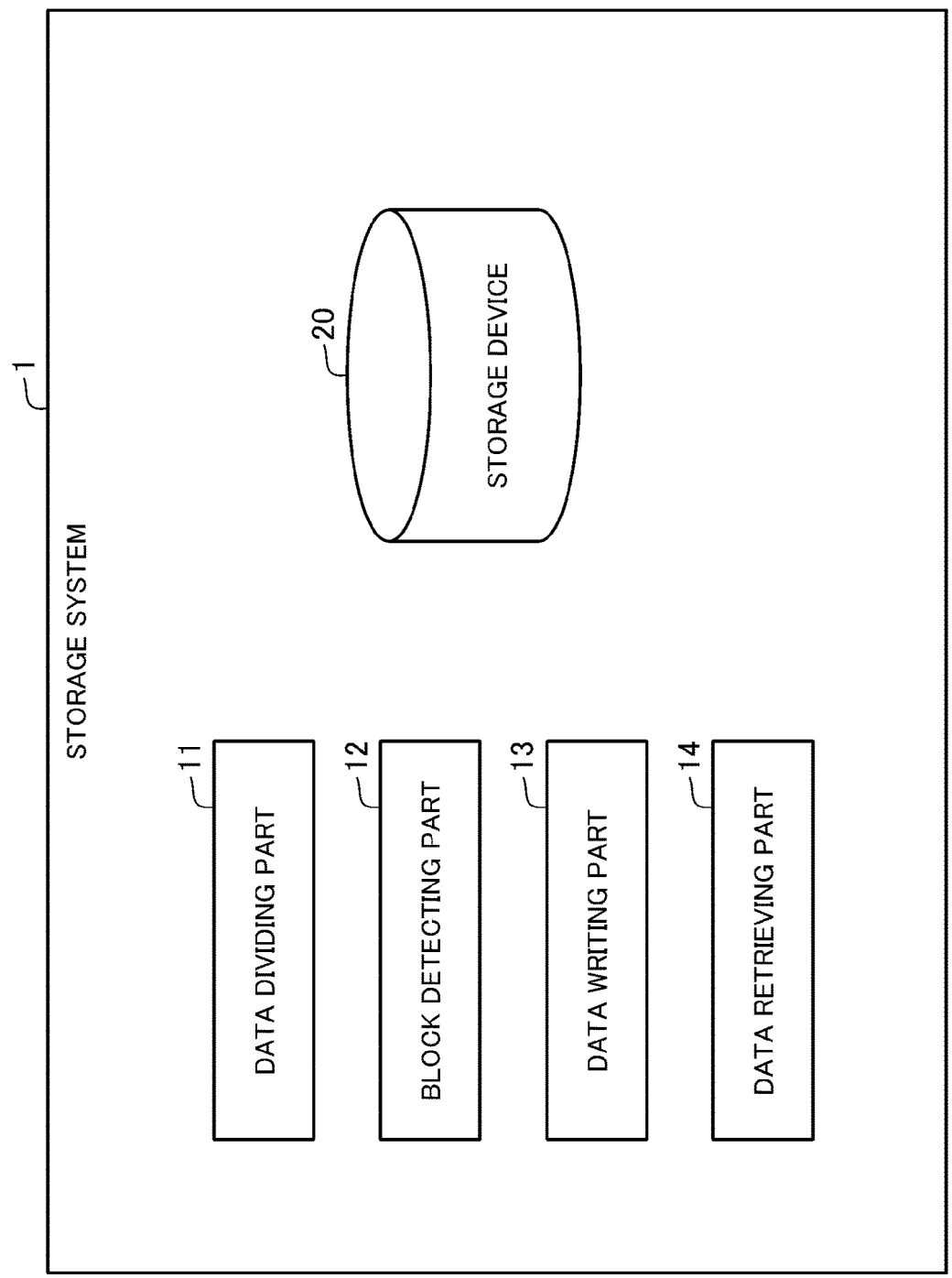
FIG. 3 is a function block diagram showing the configuration of the storage system according to the first exemplary embodiment of the present invention.
Figure 8:
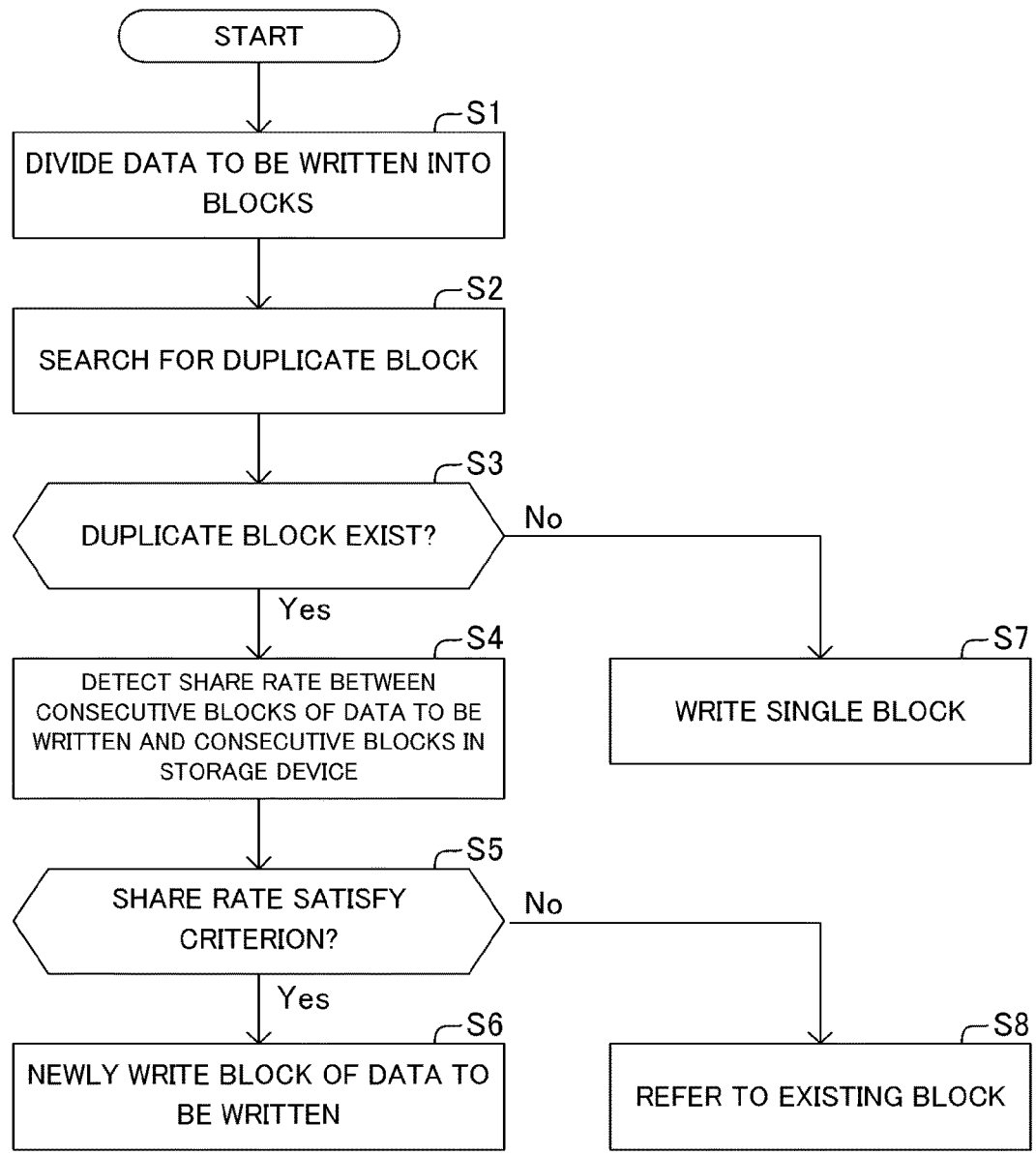
FIG. 8 is a flowchart showing an operation of the data write process in the storage system disclosed in FIG. 3.

A first exemplary embodiment of the present invention will be described with reference to FIGS. 1 to 8. FIG. 1 is a block diagram showing a configuration of a whole system. FIG. 2 is a block diagram showing an outline of the storage system, and FIG. 3 is a function block diagram showing a configuration of the storage system. FIGS. 4 to 7 are explanation views for explaining a data write process in the storage system. FIG. 8 is a flowchart showing an operation of the storage system.

This exemplary embodiment shows a specific example of a storage device and the like disclosed in Supplementary Notes described later. Below, a description will be made assuming the storage system is configured by connecting a plurality of server computers. However, the storage system in the present invention is not limited to be configured by a plurality of computers, and may be configured by one computer.

As shown in FIG. 1, a storage system 1 according to the present invention is connected to a backup system 4 that controls a backup process via a network N. The backup system 4 acquires backup target data (data to be written) stored in a backup target device 5 connected via the network N, and requests the storage system 1 to store the data. Consequently, the storage system 1 stores the backup target data requested to be stored, as a backup.

As shown in FIG. 2, the storage system 1 in this exemplary embodiment employs a configuration in which a plurality of server computers are connected. To be specific, the storage system 1 includes an accelerator node 2 that is a server computer controlling a storage reproduction operation in the storage system 1, and a storage node 3 that is a server computer equipped with a storage device for storing data. The number of the accelerator node 2 and the number of the storage node 3 are not limited to those shown in FIG. 2, and the system may be configured by connecting more nodes 2 and more nodes 3.

Furthermore, the storage system 1 in this exemplary embodiment is a content-addressable storage system that divides data and makes the data redundant to distribute and store the data into a plurality of storage devices and, by a unique content address set depending on the content of the stored data, specifies a storage position in which the data is stored. This content-addressable storage system will be described in detail later.

Below, assuming the storage system 1 is one system, a configuration and a function of the storage system 1 will be described. That is to say, the configuration and the function of the storage system 1 described below may be included in either the accelerator node 2 or the storage node 3. The storage system 1 is not necessarily limited to being equipped with the accelerator node 2 and the storage node 3 as shown in FIG. 2, and may have any configuration. For example, the storage system 1 may be configured by one computer. Besides, the storage system 1 is not limited to a content-addressable storage system, and may be any storage system as far as it has a deduplication function.

FIG. 3 shows a configuration of the storage system 1 in this exemplary embodiment. As shown in this figure, the storage system 1 is configured by server computers, and includes an arithmetic device (not shown) executing a predetermined arithmetic process and a storage device 20. Moreover, the storage system 1 includes a data dividing part 11, a block detecting part 12, a data writing part 13, and a data retrieving part 14, which are structured by installation of a program into the arithmetic device.

Actually, the configuration of the storage system 1 described above is configured by an arithmetic device such as a CPU (Central Processing Unit) and a storage device such as a hard disk drive, which each of the accelerator nodes 2 and the storage nodes 3 shown in FIG. 2 has.

As described above, the storage system 1 in this exemplary embodiment is a content-addressable storage system. Therefore, the storage system 1 has a function of storing data into the storage device 20 by using a content address and, as described below, stores data by dividing and distributing the data and specifying a storage position by a content address. A data write process using a content address in the storage system 1 will be described below with reference to FIGS. 4, 5 and 8.

Figure 4:
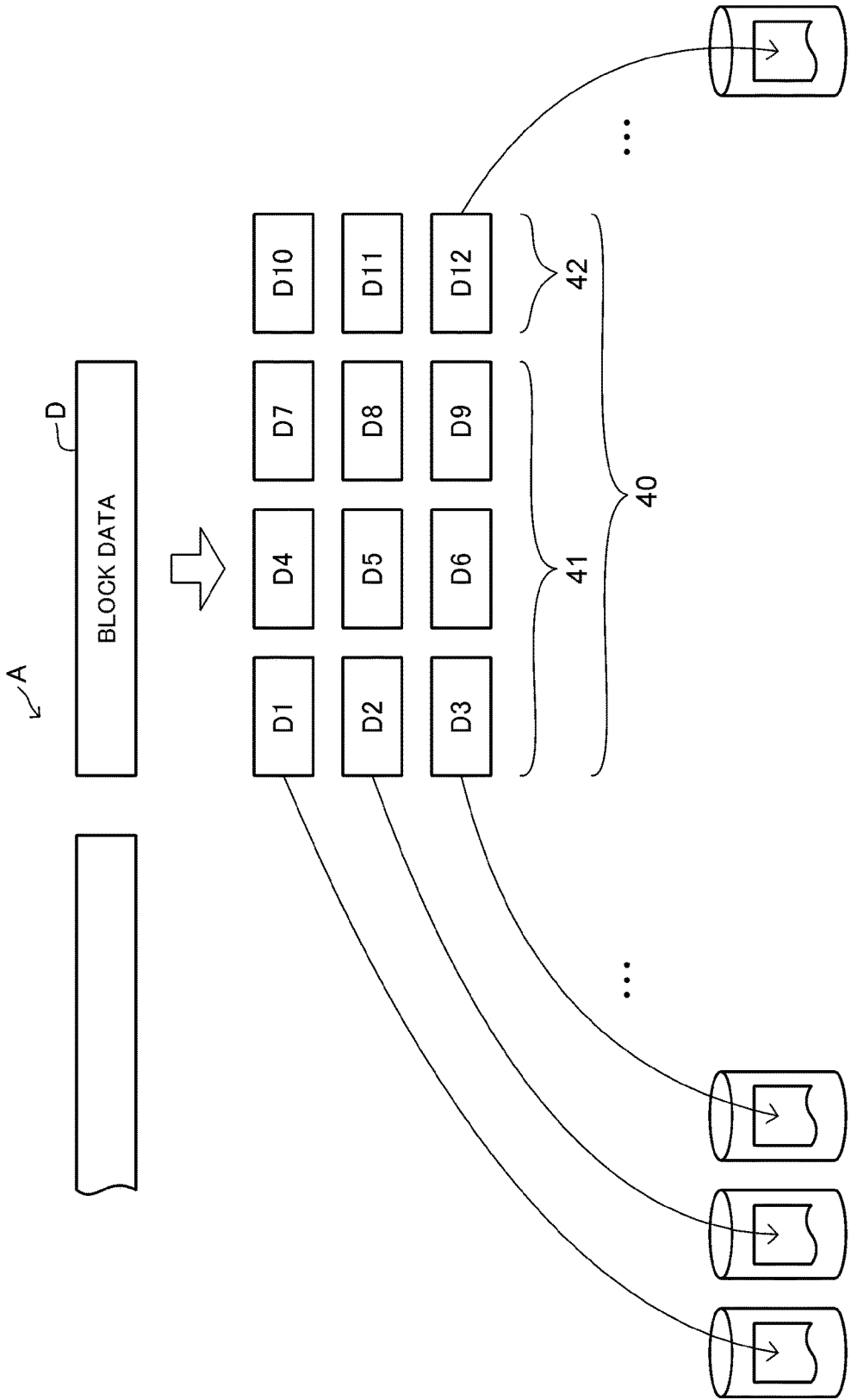
FIG. 4 is an explanation view for explaining an aspect of a data write process in the storage system disclosed in FIG. 3.
Figure 5:
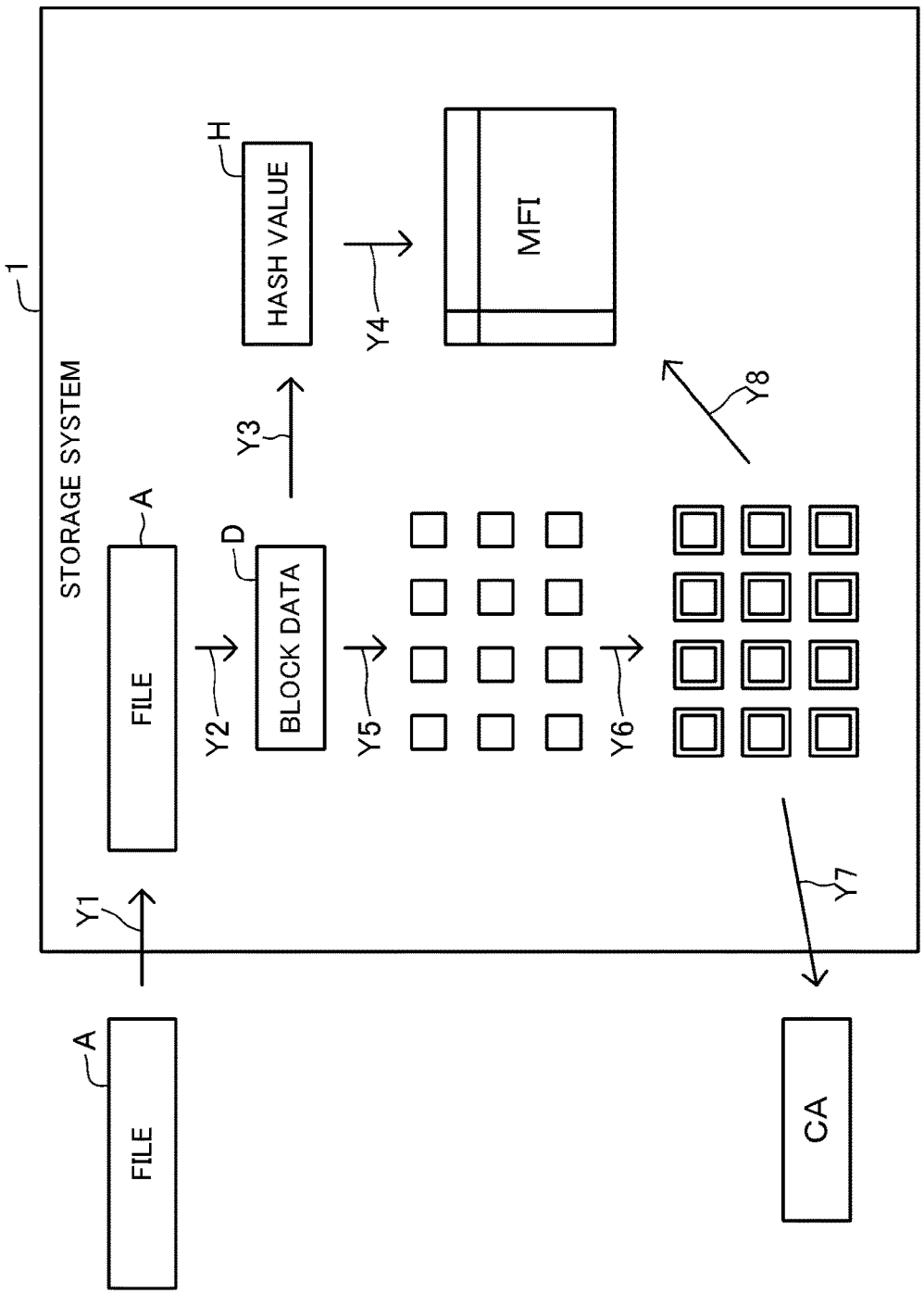
FIG. 5 is an explanation view for explaining an aspect of the data write process in the storage system disclosed in FIG. 3.

At first, the storage system 1 accepts an input of a file A requested to be written as shown by an arrow Y1 in FIGS. 4 and 5. Then, the data dividing part 11 divides the file A into block data D of a predetermined capacity (e.g., 64 KB), as shown by an arrow Y2 in FIGS. 4 and 5 (step S1 of FIG. 8).

Subsequently, based on the data content of the block data D, the block detecting part 12 calculates a unique hash value H representing the data content (an arrow Y3 of FIG. 5). For example, a hash value H is calculated from the data content of block data D by using a previously set hash function.

Subsequently, by using the hash value H of the block data D of the file A, the block detecting part 12 checks whether the block data D has already been stored (step S2 of FIG. 8). To be specific, firstly, in a case that the block data D has already been stored, the hash value H thereof and a content address CA representing a storage position thereof have been associated and registered in an MFI (Main Fragment Index) file. Therefore, in a case that the hash value H of the block data D calculated before being stored exists in the MFI file, the storage system 1 can judge that block data D of the same content has already been stored (an arrow Y4 of FIG. 5; "Yes" at step S3 of FIG. 8). In this case, a content address CA associated with the hash value H registered in the MFI, which coincides with the hash value H of the block data D before being stored, is acquired from the MFI file. Then, this content address CA is returned as the content address CA of the block data D requested to be written.

Then, the data writing part 13 uses the already stored data to which the returned content address CA refers, as block data D requested to be written (step S8 of FIG. 8). That is to say, by designating a region to which the returned content address CA refers, as a storage destination of the block data D requested to be written, it is assumed that the block data D requested to be written is stored. Consequently, the need for storing block data D relating to a write request into the actual storage device 20 is eliminated.

Further, in a case that it is judged by the block detecting part 12 that the block data D requested to be written has not been stored yet ("No" at step S3 of FIG. 8), the data writing part 13 writes the block data D requested to be written in the following manner (step S7 of FIG. 8). At first, the data writing part 13 compresses the block data D relating to a write request and, as shown by an arrow Y5 in FIG. 5, divides the data into a plurality of fragment data of a predetermined capacity. For example, the data writing part 13 divides the data into nine pieces of fragment data (division data 41) as shown by reference numerals D1 to D9 in FIG. 4. Moreover, the data writing part 13 generates redundant data so that it is possible to restore the original block data even when some of the division fragment data are lost, and adds the redundant data to the division fragment data 41. For example, the data writing part 13 adds three pieces of fragment data (redundant data 42) as shown by reference numerals D10 to D12 in FIG. 4. Thus, the data writing part 13 generates a data set 40 that includes twelve pieces of fragment data configured by the nine pieces of division data 41 and the three pieces of redundant data.

Subsequently, the data writing part 13 distributes and stores the fragment data configuring the data set generated as described above into storage regions formed on the storage devices, respectively. For example, in the case of generating the twelve pieces of fragment data D1 to D12 as shown in FIG. 4, the data writing part 13 stores the fragment data D1 to D12 one by one into data storage files formed in the plurality of storage devices, respectively (refer to an arrow Y6 in FIG. 5).

Subsequently, the storage system 1 generates and manages a content address CA representing a storage position of the fragment data D1 to D12 stored as described above, that is, a storage position of the block data D to be restored from the fragment data D1 to D12. To be specific, the storage system 1 generates the content address CA by combining part (a short hash: e.g., initial 8B (bytes) of the hash value H) of the hash value H calculated based on the content of the stored block data D with information representing a logical storage position. The storage system 1 then returns this content address CA to a file system in the storage system 1 (an arrow Y7 in FIG. 5). The storage system 1 manages identification information such as a file name of backup target data and the content address CA in association with each other in the file system.

Further, each of the storage nodes 3 manages a content address CA of block data D and a hash value H of the block data D in association with each other in the MFI file. Thus, the content address CA is stored in association with information specifying a file, the hash value H, and so on into the storage device of the accelerator node 2 or the storage nodes 3.

Furthermore, the storage system 1 causes the data retrieving part 14 to execute control of retrieving the file stored as described above. For example, when a retrieval request with a specific file designated is made to the storage system 1, the data retrieving part 14 firstly designates a content address CA composed of a short hash that is part of a hash value corresponding to the file requested to be retrieved and logical position information, based on the file system. Then, the data retrieving part 14 checks whether the content address CA is registered in the MFI file. When the content address CA is not registered, the requested data is not stored, so that the data retrieving part 14 returns error.

On the other hand, when the content address CA relating to the retrieval request is registered, the data retrieving part 14 specifies a storage position designated by the content address CA, and retrieves each fragment data stored in this specified storage position, as data requested to be retrieved. At this moment, in a case that data storage files storing the respective fragments and the storage position of the fragment data of one of the data storage files are known, it is possible to specify the storage position of the other fragment data based on the same storage position.

Then, the data retrieving part 14 restores block data D from the respective fragment data retrieved in response to the retrieval request. Moreover, the data retrieving part 14 connects a plurality of restored block data D, restores into a group of data like a file A, and returns it.

When data relating to a write request is written in the storage system 1 in the above manner, there is a case that a plurality of block data obtained by dividing the data are stored in a scattered state in the storage device as mentioned above. In this case, there is a fear that retrieval performance decreases, but the storage system 1 in this exemplary embodiment also has the following function in order to solve such a problem. Below, the function will be described in detail with reference to FIGS. 6 to 8.

At first, as mentioned above, the block detecting part 12 checks whether block data of the same content as block data obtained by dividing data A relating to a write request is already stored in the storage device 20 (steps S1 and S2 of FIG. 8). For example, in an example shown in FIG. 6, firstly, the block detecting part 12 considers block data 1 obtained by dividing the data A relating to the write request, as a target block which should be subjected to a storage process at this moment, and checks whether block data of the same content as the target block exists in data B stored in the storage device 20.

Figure 6:
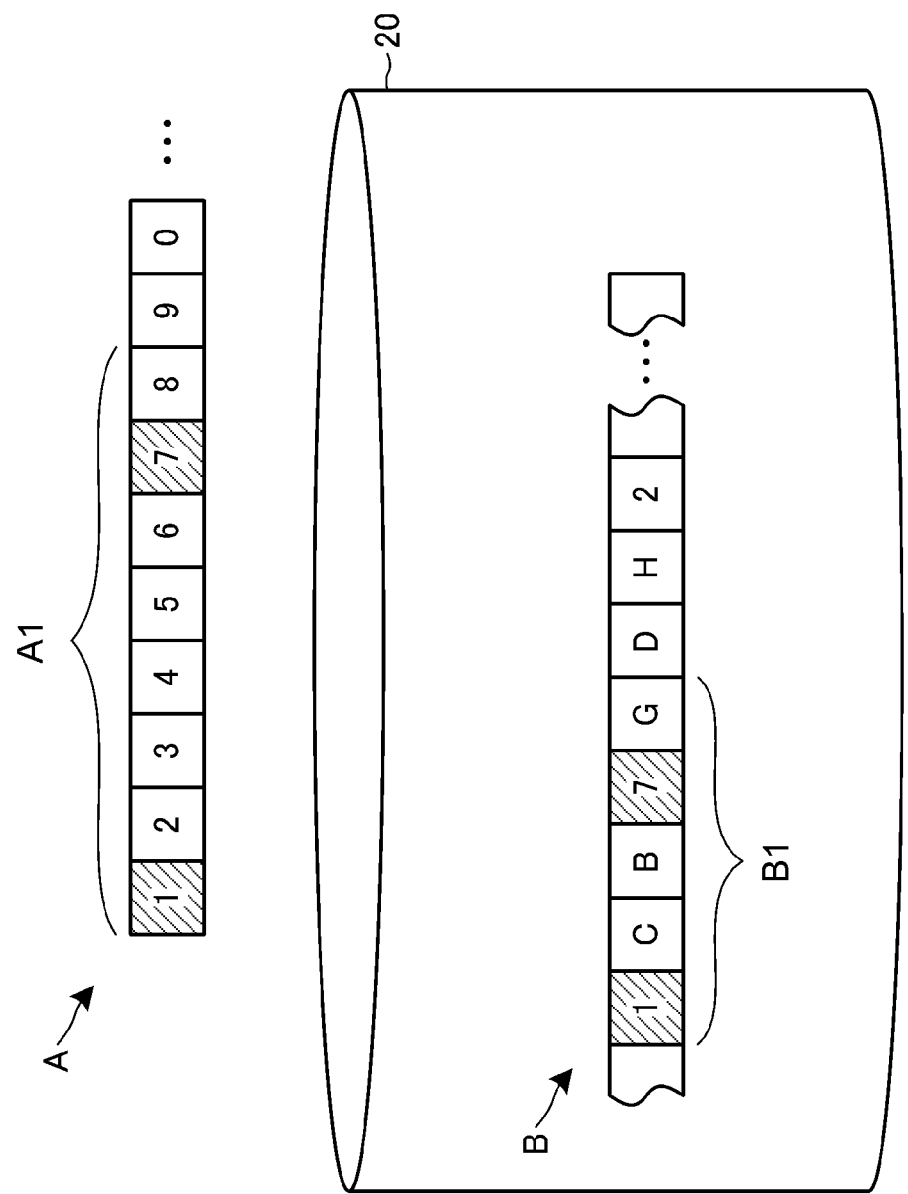
FIG. 6 is an explanation view for explaining an aspect of the data write process in the storage system disclosed in FIG. 3.
Figure 7:
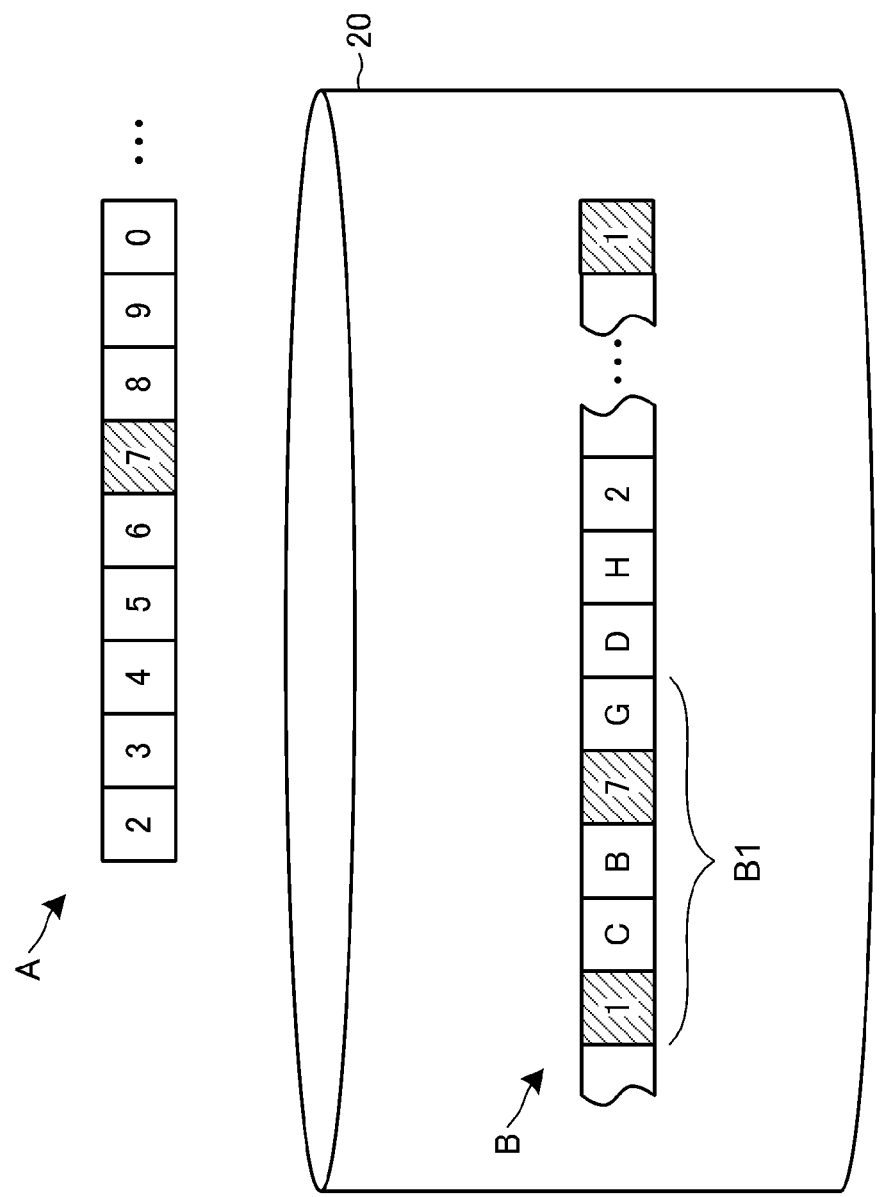
FIG. 7 is an explanation view for explaining an aspect of the data write process in the storage system disclosed in FIG. 3.

Then, when the block data 1 of the same content as the target block also exists in the storage device 20 as shaded in FIG. 6 ("Yes" at step S3 of FIG. 8), the block detecting part 12 acquires a plurality of block data which are consecutive from the target block (the block data 1) in the data A relating to the write request. In the example shown in FIG. 6, the block detecting part 12 acquires consecutive block data A1 composed of block data 1 to 8 configuring a predetermined range in the data A relating to the write request. The block detecting part 12 also acquires a plurality of block data stored in a region consecutive from the block data 1 of the same content as the target block among the data B stored in the storage device 20, that is, in the example shown in FIG. 6, acquires consecutive block data B1 composed of blocks 1, C, B, 7 and G configuring a predetermined range in the data B. The consecutive block data A1 acquired from among the data A relating to the write request is, for example, block data corresponding to 5 MB, and the consecutive block data B1 acquired from among the data B in the storage device 20 is, for example, block data corresponding to 2 MB. Thus, the volumes of the consecutive block data A1 and B1 may be different from each other, or may be the same.

Furthermore, the block detecting part 12 detects a share rate representing a rate of a shared portion between the respective block data included in the consecutive block data A1 acquired from among the data A relating to the write request as described above and the respective block data included in the consecutive block data B1 acquired from the storage device 20 (step S4 of FIG. 8). For example, the block detecting part 12 detects the number of identical block data by using a hash value of each of the block data as mentioned above. In the example of FIG. 6, two block data 1 and 7 are shared in the consecutive block data A1 and B1, and the block detecting part 12 detects a ratio thereof as a share rate.

After that, the data writing part 13 executes writing of block data in the following manner in accordance with a value of the share rate detected by the block detecting part 12 in the above manner. At first, when the share rate is larger than a previously set value (e.g., when larger than 50%) ("No" at step S5 of FIG. 8), the data writing part 13 executes a usual write process on the target block (the block data 1) of the data A relating to the write request. That is to say, because the block data of the same content as the target block of the data A relating to the write request is already stored in the storage device 20, the data writing part 13 executes a process of referring to the block data already stored in the storage device 20, and does not execute duplicated storage (step S8 of FIG. 8).

Thus, when the share rate between the respective consecutive block data is large, it can be said that other block data following the target block of the data A relating to the write request is also stored in a region of a predetermined range following the block data of the same content as the target block in the storage device 20, so that the data writing part 13 executes a usual storing process on the target block in the above manner. After that, the data writing part 13 executes the same process as described above on the next target block, namely, block data 2 of the data A relating to the write request. Consequently, at the time of retrieval of the data A relating to the write request later, it is possible, by retrieving consecutive block data of the already stored data B, to retrieve the data A with efficiency. Moreover, because elimination of duplicated storage of block data is also executed, it is possible to reduce the storage volume.

On the other hand, when the share rate is equal to or less than the previously set value (e.g., when equal to or less than 10%) ("Yes" at step S5 of FIG. 8), the data writing part 13 newly writes the target block (the block data 1) of the data A relating to the write request into the storage device 20 (step S6 of FIG. 8). That is to say, in the example of FIG. 6, because identical shared blocks are only two and the share rate is equal to or less than the previously set value, the data writing part 13 writes the block data 1 into the storage device 20 as rewrite block data though the block data 1 is already stored in the storage device 20 (refer to FIG. 7). At this moment, the block data 1 to be rewritten is written into the end of a region in which data is already written within the storage device 20. After that, on next block data 2 of the data A relating to the write request, the processes of steps S1 to S8 in FIG. 8 are executed in the same manner as mentioned above. For example, in a case that the block data 2 is not stored in the storage device 20 yet, the block data 2 is written into a region next to the block data 1 having been rewritten as described above within the storage device 20.

Thus, when the share rate of the consecutive block data is small, it can be said that the target block of the data A relating to the write request and the respective block data following the target block are stored in a distributed state in the storage device 20, so that the data writing part 13 newly writes the target block of the data A relating to the write request. Consequently, at the time of retrieval of the data A later, by retrieving the block data written in consecutive regions in the storage device 20, it becomes highly probable that a plurality of block data configuring the data A can be retrieved together, and it is possible to increase retrieval performance.

When the block detecting part 12 detects the share rate between the respective consecutive block data relating to the write request and the consecutive block data having already been stored, the sequence of the block data in the respective consecutive block data is not important. That is to say, when block data of the same content exists in any position in each of the consecutive block data, the block detecting part 12 detects that the block data is shared. Then, the block detecting part 12 detects the share rate based on the number of shared block data. The value of the share rate may be a value of the number of shared block data, or may be a rate of sharing of block data in the consecutive block data. A share rate is thus detected regardless of the sequence of respective block data in respective consecutive block data because, as mentioned above, at the time of retrieval, it is possible to retrieve related blocks near each other at one time by retrieving consecutive block data written in consecutive regions in the storage device 20.

Further, as mentioned above, the data writing part 13 does not newly write the block data at all times, but newly writes the block data only in a case that the following condition is satisfied. For example, the data writing part 13 calculates a ratio of the volume of block data newly written into the storage device 20 in a duplicated manner to the volume of data already written in the storage device 20 among the data A relating to the write request (for example, the volume of a series of stream data relating to a current write request), and writes the block data when the ratio is equal to or less than a predetermined ratio (e.g., 5%). Consequently, it is possible to limit the volume of block data duplicated and stored in the storage device 20. Moreover, by limiting the volume of rewriting to the storage device 20, it is possible to limit decrease of a writing speed due to rewriting. The condition for writing block data again may be any condition. For example, it may be a condition such that the volume of the written block data is equal to or less than a volume previously set depending on the capacity of the storage device 20.

As described above, according to the storage system in this exemplary embodiment, it is possible to limit scattering of block data in the whole storage region in the storage device while executing elimination of duplicated storage. Therefore, when retrieving data later, it is possible to limit scanning of a number of disks and it is possible to limit decrease of retrieval performance. On the other hand, in order to limit decrease of retrieval performance, duplicated storage of block data is permitted, but it is possible to limit increase of storage volume by limiting the volume of the duplicated storage.

Second Exemplary Embodiment

A second exemplary embodiment of the present invention will be described in the form of a report below.

<1 Introduction>

Deduplication is a hot topic in storage for about a decade already. The effectiveness of such approach in reducing both time needed to perform backups and storage space required to save them has been widely described and tested. Today, storage systems with data deduplication deliver new records of backup bandwidth and market is being flooded with various dedup solutions proposed by many vendors. In practice, deduplication has become one of indispensable features of backup systems.

Traditionally, performance of a deduplication system is described by the data deduplication ratio, maximal write performance and restore bandwidth. Actual performance achieved by a regular customer in his working environment can often differ from these numbers for various reasons. In particular, the read bandwidth is usually very good for an initial backup saved to an empty system, but it deteriorates for subsequent backups. The primary reason for this is data fragmentation introduced by in-line deduplication which results in data logically belonging to a recent backup scattered across multiple older backups. This effect increases with each backup, as more and more of its data is actually located in previous backups. Depending on the data set, its characterization and backup pattern, our performance experiments show a decrease of read performance from a few up to more than 50%. As our data sets cover not more than 15 consequent backups, we expect this percentage to be even higher when more backups are performed.

The increasing fragmentation of subsequent backups can be completely avoided with so called post-process (off-line) forward-pointing deduplication, in which the latest backup is saved without any deduplication, and later it is done in the background in such way that the latest copy of a block is preserved. With this method, the latest backup is always not fragmented, and the fragmentation increases with backup age. Since usually we restore the latest backup, this solution looks promising. Unfortunately, such approach suffers from many problems, the most severe are an increased storage consumption because of space needed for data before deduplication and a significant reduction in write performance because writing new copies of duplicated data is usually much slower than deduplicating such data in-line. The latter problem occurs because writing new data requires transferring of the data across the network and committing it to disk, whereas hash-based dedup needs only comparison of block hash against hashes of blocks stored in the system.

The holy grail here is to avoid the reduction in restore performance without reducing write performance and without affecting duplicate elimination effectiveness. In other words, the ideal deduplication solution should achieve high write bandwidth of in-line approach and high restore performance without any reduction caused by fragmentation.

The remainder of the paper is organized as follows: the next section provides the motivation for this work and gives a few examples of the magnitude of the problem. Section 3 looks closer at the nature of the problem of fragmentation and identifies solution requirements. In Section 4 we describe in detail assumptions about backup systems to which our solution is applicable. Section 5 presents the solution called context-based rewriting (CBR in short), followed by its discussion and potential extensions. Section 6 contains the assumptions and the methodology used in performance experiments. Evaluation of our algorithm, including discussion of performance results is given in Section 7. Related work is discussed in Section 8 together with other solutions to the fragmentation problem. Finally, Section 9 contains conclusions and directions for future work.

2 Motivation

(2.1 Problem Introduction)

To illustrate the problem, let's assume full backup of only one filesystem done every week. Additionally, we assume a backup system with backward-pointing deduplication, i.e. the oldest copy of the block is preserved. This is naturally the case with in-line deduplication, as the new copy is not even written.

Figure 9:
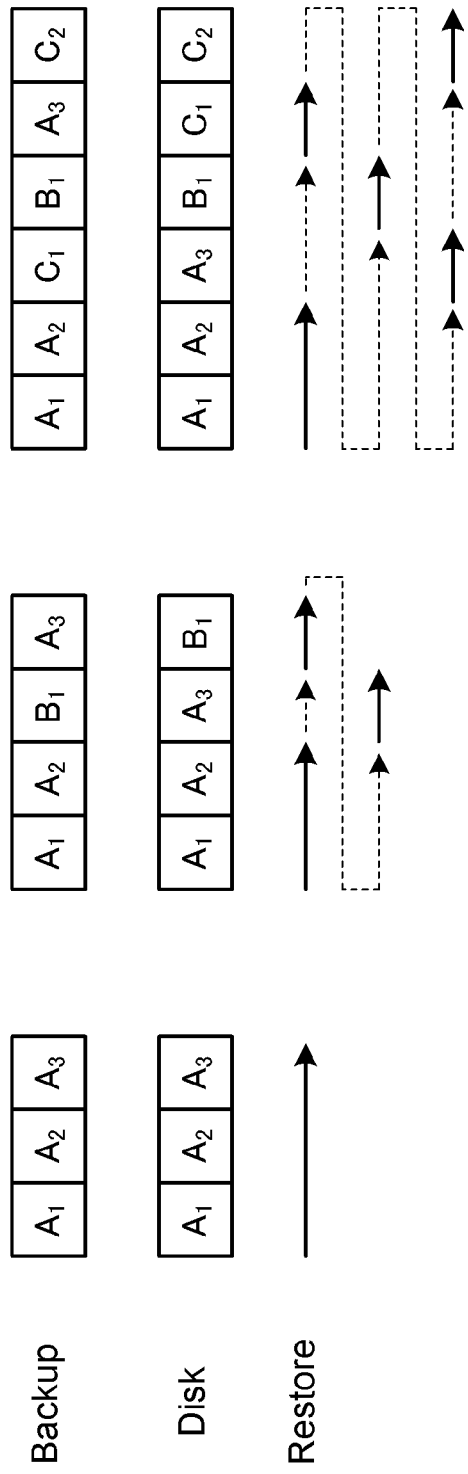
FIG. 9 is a view referred to in a report explained in a second exemplary embodiment of the present invention.

Usually, a filesystem is not modified much between two backups and after the second backup many duplicates are detected and not stored again. In the end, the first backup is placed in continuous storage space and all the new blocks of the second backup are usually stored after the end of currently occupied space (see FIG. 9). (FIG. 1: Backup fragmentation process caused by duplicate elimination.)

Such scenario is continued during following backups. After some number of backups, blocks from the latest backup are scattered all over the storage space. This results in large number of disk seeks needed for reading the latest backup and in consequence, a very low read performance (see the restore process of last backup on FIG. 9).

This process of scattering data is called fragmentation and can be very harmful when coming to critical restore. The important fact is that the above scenario is very typical and leads to the highest fragmentation of the backup written most recently—the one which will most likely be needed for restore when user data is lost.

(2.2 Problem Magnitude)

Although the fragmentation problem is apparent, its severity needs further investigation. For this, we have simulated writing 4 backup data sets to an in-line deduplication storage system. Next, we simulated each backup restore using fixed-size prefetch. During the experiments, all duplicate blocks (of expected size 8 KB and created with Rabin fingerprint chunking algorithm) were eliminated in order to secure maximal possible deduplication ratio. After each backup, restore bandwidth was measured as a percentage of maximal bandwidth—i.e. the one achieved when only one backup is present in the system.

To simplify the analysis, we assume in this work that the read bandwidth is inversely proportional to the number of data I/O operations performed during restore. Although certainly there are systems for which performance is influenced by other bottlenecks, we think that correlating achieved bandwidth with the number of fixed-size I/Os allows us to focus on the core of the fragmentation problem and disregard secondary factors like network and CPU speeds.

Figure 10:
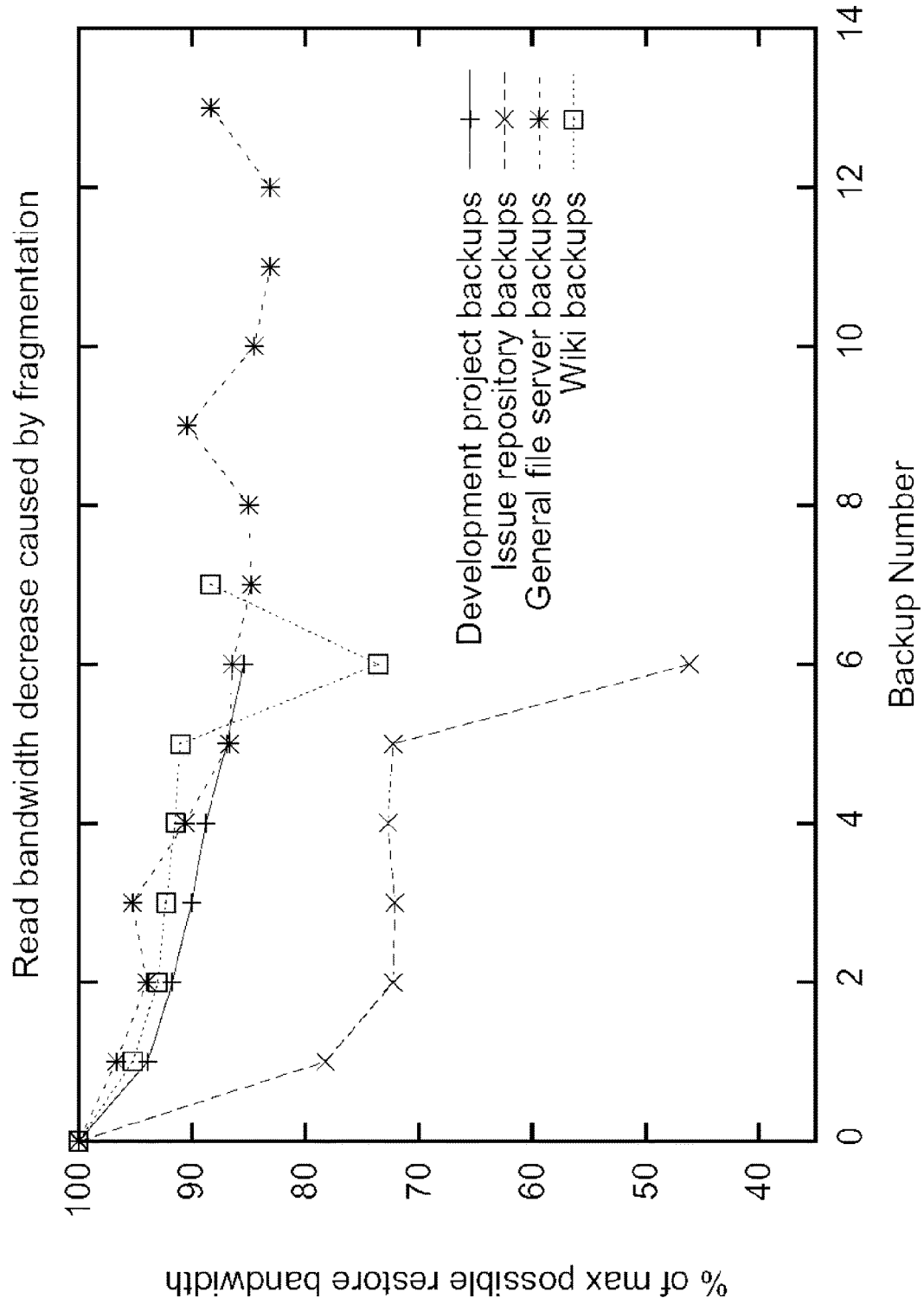
FIG. 10 is a view referred to in the report explained in the second exemplary embodiment of the present invention.

FIG. 10 shows the restore bandwidth for various backup sets, relative to maximal bandwidth normalized to 100 achieved for each backup without inter-version stream fragmentation. That is, the number 45 means that only about 45% of maximum restore bandwidth is achieved for a particular backup set and backup number, i.e. restore of such backup will be more than two times slower because of fragmentation across backup streams.

When looking at the FIG. 10, a few interesting observations can be made. First is the clear tendency for the fragmentation to spread out and increase over time (with some rare exceptions). Second is the different impact of this factor on each data set: the achievable read bandwidth varies from 45% of the maximum bandwidth after 7 issue repository backups to about 88% of the maximum after 8 wiki backups. (FIG. 10: Read bandwidth as a percent of maximal possible bandwidth for each consequent backup (inversely proportional to the number of I/Os needed for restore)).

The most important factors causing such variation in results are:
- number of duplicates in the stream—generally, low fraction of duplicates results in low fragmentation, but exceptions to this rule are possible,
- the characteristics of duplicated/new data pattern—whether the new data is placed rather continuously or in short sequences among duplicates; also whether duplicates appear in the latest backup in long sequences like when originally written, or more randomly.
- number of already backed up versions of a stream—more backups mean more streams to deduplicate against, and in consequence potential for higher fragmentation,
- size of the stream—it is much easier to introduce high fragmentation in a small stream, because large streams usually have some root data which is rarely modified; such data reduces fragmentation of a stream as a whole.

In this work we do not perform separate analysis of impact of each of these factors on the backup fragmentation. Our decision is motivated on one hand by a limited space available for this work; on the other hand many of these factors are related to intrinsic characterization of user data and backup retention policy, both of which usually cannot be changed. However, the investigation of these factors is certainly warranted to estimate severity of the fragmentation problem for a particular user.

3 Deduplicating Backup vs. Fragmentation

Fragmentation is a natural by-product (or rather waste) of deduplication. It is possible to completely eliminate fragmentation by keeping each backup in separate continuous disk space with no interference between backups, however in such case there will be no deduplication.

Another approach to practically eliminate impact of fragmentation on restore performance is to use big expected block size for deduplication. In such case, when fragmentation happens, it will not degrade restore speed much, because even if we need a disk seek for each block, the seek time is dominated by the time needed to read block data.

For example, with 4 MB expected blocks size, read disk bandwidth of 40 MB/s and 5 ms seek time, doing a seek on each block read will increase the restore time by about 5%. However, optimal block size for deduplication varies between 4 KB and 16 KB depending on particular data pattern and storage system characterization (note that we need to include block metadata in computing the effectiveness of dedup). With larger blocks, the dedup becomes much less effective, so using such big blocks is not a viable option.

(3.1 Fragmentation Impact Reduction Idea)

Although we cannot eliminate fragmentation completely for all backups because of deduplication, we can try to eliminate restore slowdown caused by fragmentation in vast majority of cases without worsening much other performance metrics like write performance and dedup effectiveness. Our approach is based on the observation that the most usual case of data restore after failure is performed from the latest (or close to latest) data backup. This is because users are usually interested in having the most up to date information restored.

Figure 11:
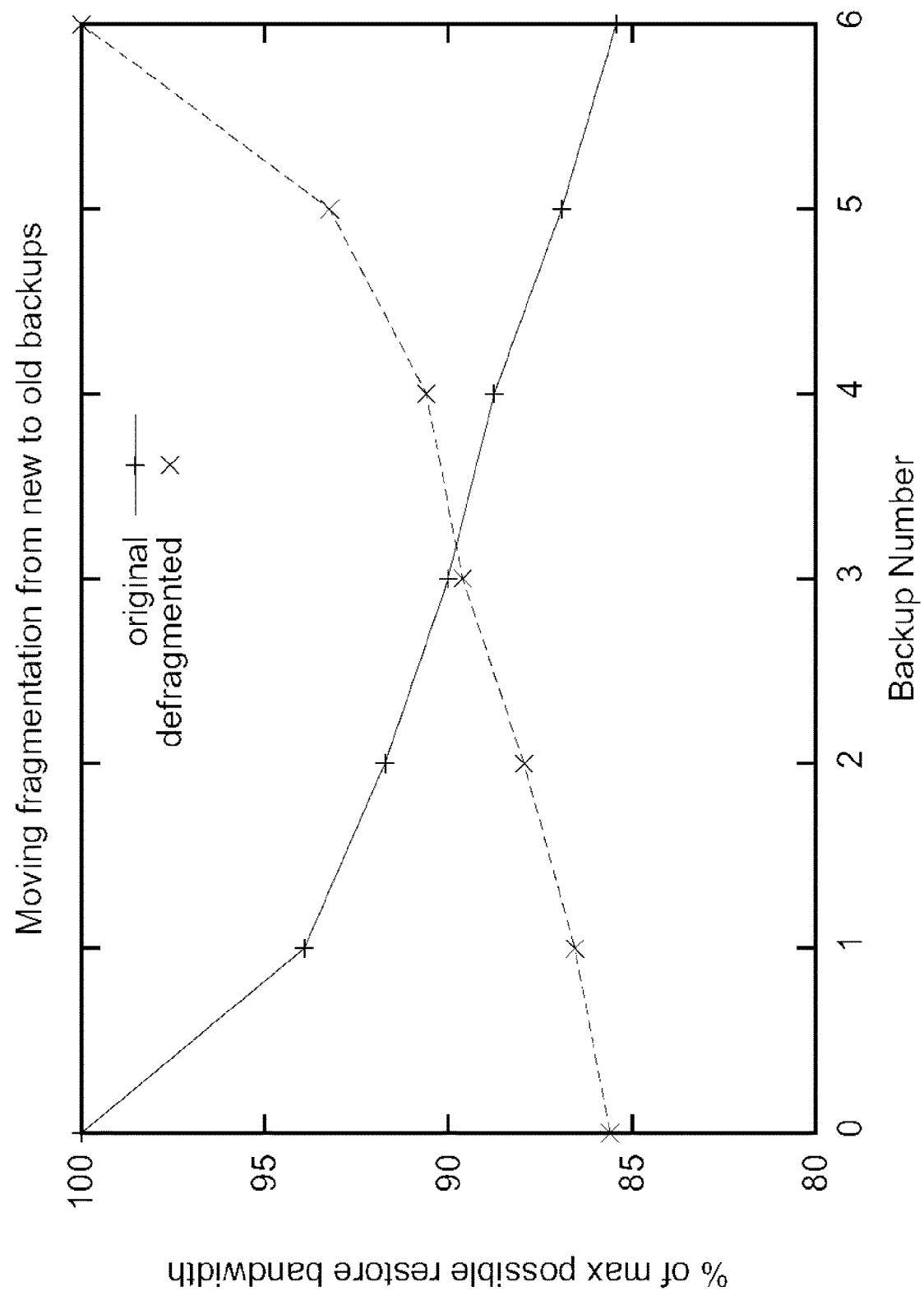
FIG. 11 is a view referred to in the report explained in the second exemplary embodiment of the present invention.

Based on the above observation, we can try to eliminate fragmentation for the latest backups at the expense of the older ones. An example of such approach is given in FIG. 11. It presents the basic fragmentation of 7 consequent backup streams (the curve labeled original) with fragmentation decreasing with age, and the same backups again achieved with off-line defragmentation (the curve labeled defragmented) which results in the latest backup written continuously to disk and fragmentation increasing with the backup age. We'd like to achieve similar effect with yet-undefined on-line defragmentation process. (FIG. 11: Each backup fragmentation after off-line deduplication [rewriting every backup] (on real example of 7 development project backups)

(3.2 Solution Requirements)

The fragmentation problem requires a solution without negative effects on other important metrics of deduplication system: The solution we have in mind should:

eliminate reduction in restore bandwidth for the latest backup (i.e. compared to the bandwidth which would be achieved when only one backup is stored in the entire system)

introduce very little performance drop for ongoing backups (comparing to the case without the solution), not degrade duplication effectiveness and in general use little additional space, not require much additional resources like disk bandwidth, spindles and processing power, be manageable to offer a range of choices in addressing trade-offs.

<4 Backup Systems with In-Line Dedup>

To implement our defragmentation solution described in the next section, we assume that backup storage supports the following features:

content addressability: This is a base feature useful for the subsequent features described below.

deduplication query based on checking for block hash existence: It is very important that such query works using hash and causes reading metadata only as they are much smaller than the whole block and can be easily prefetched for streaming access. Even more important is fact that deduplication by reading the entire block would result in fact in reading the fragmented stream and very low total write performance. We note here, that with high fragmentation we may not have enough spindles to read even block metadata fast enough. However, there exists solution to this problem based on flash memory, whereas SSDs are too small and too expensive to hold entire backup data.

fast determination of disk-adjacent blocks: Given two blocks, we should be able to determine quickly if they are close to each other on disk. This can be achieved in many ways, but for simplicity we assume that each deduplication query which confirms block existence in the system returns location of this block on disk. Another method to verify if two blocks are close on disk is to retrieve hashes of blocks which are close to one of the blocks on disk and then check if the second block hash is one of the retrieved hashes. A combination of both of these methods is also possible.

ability to write a block already existing in the system. This is needed when a decision is made to store a block again in order to increase future read performance. Such rewrite effectively invalidates the previous copy in such way that all the backups stored previously can now use the new copy instead of the old one. Note that content addressability delivers this feature practically for free.

As the above features are fairly simple, the algorithm described in the next section can be seen as very generic and easily adoptable to most systems with in-line deduplication.

<5 The CBR—Context-Based Rewriting>

(5.1 Block Contexts)

Figure 12:
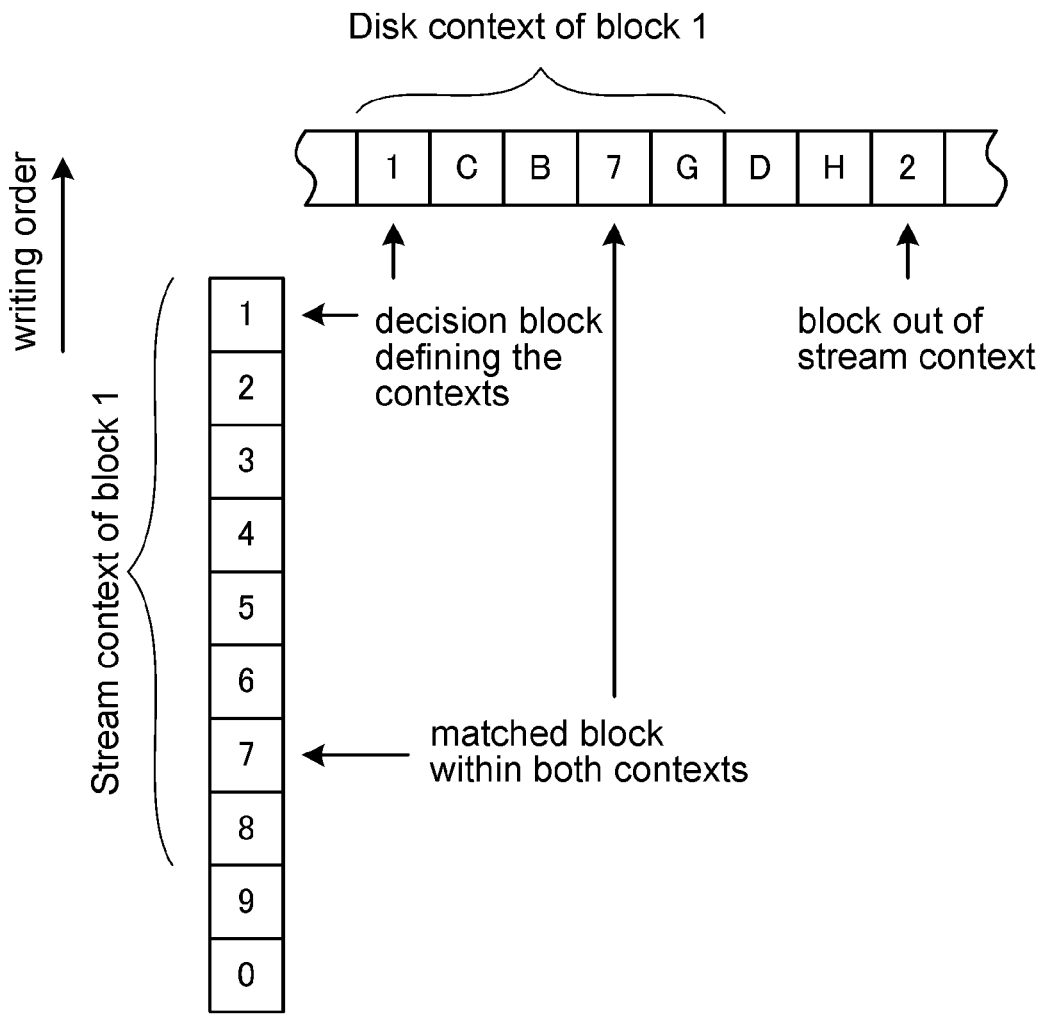
FIG. 12 is a view referred to in the report explained in the second exemplary embodiment of the present invention.
Figure 15A:
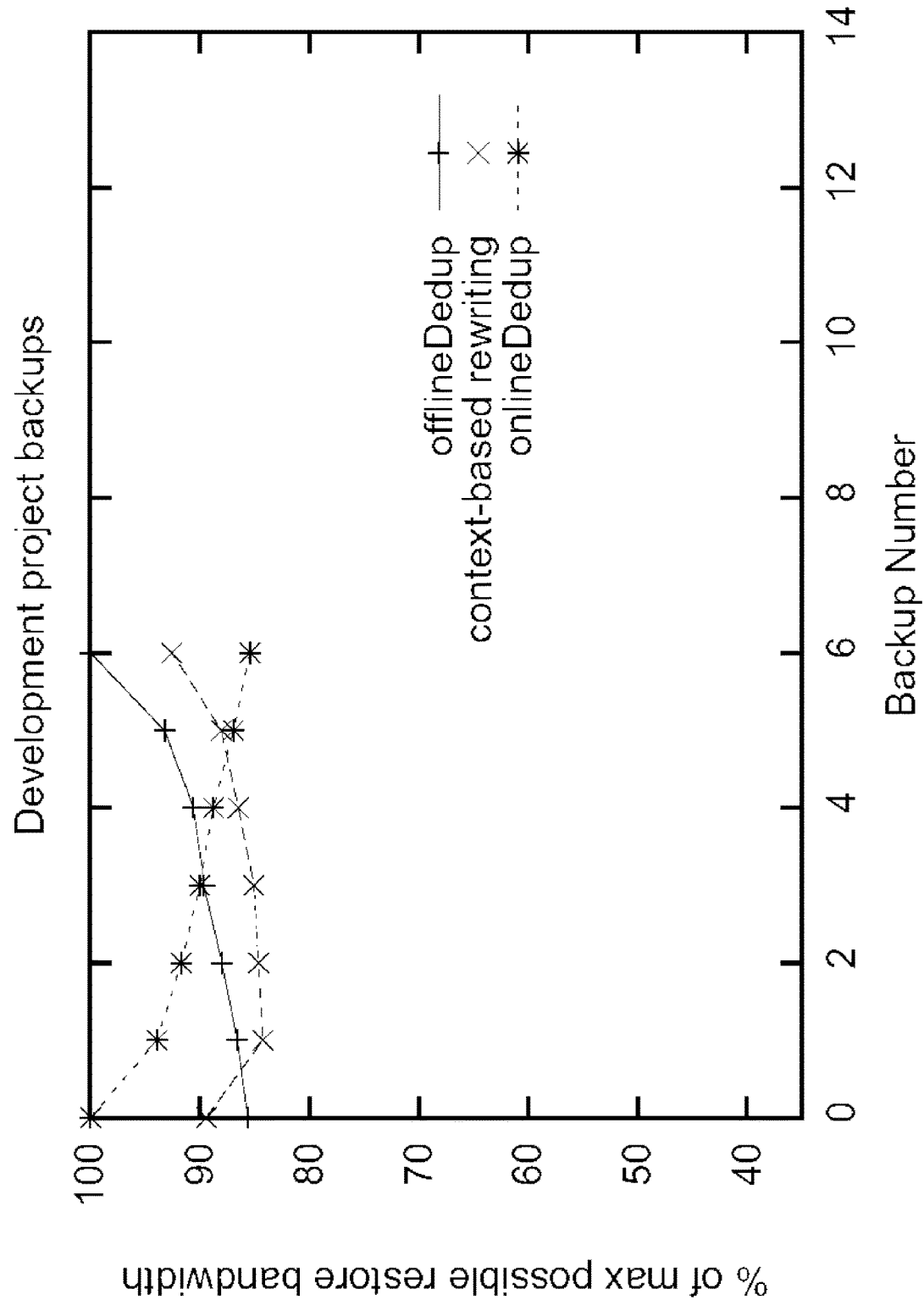
FIG. 15*a* is a view referred to in the report explained in the second exemplary embodiment of the present invention.
Figure 15B:
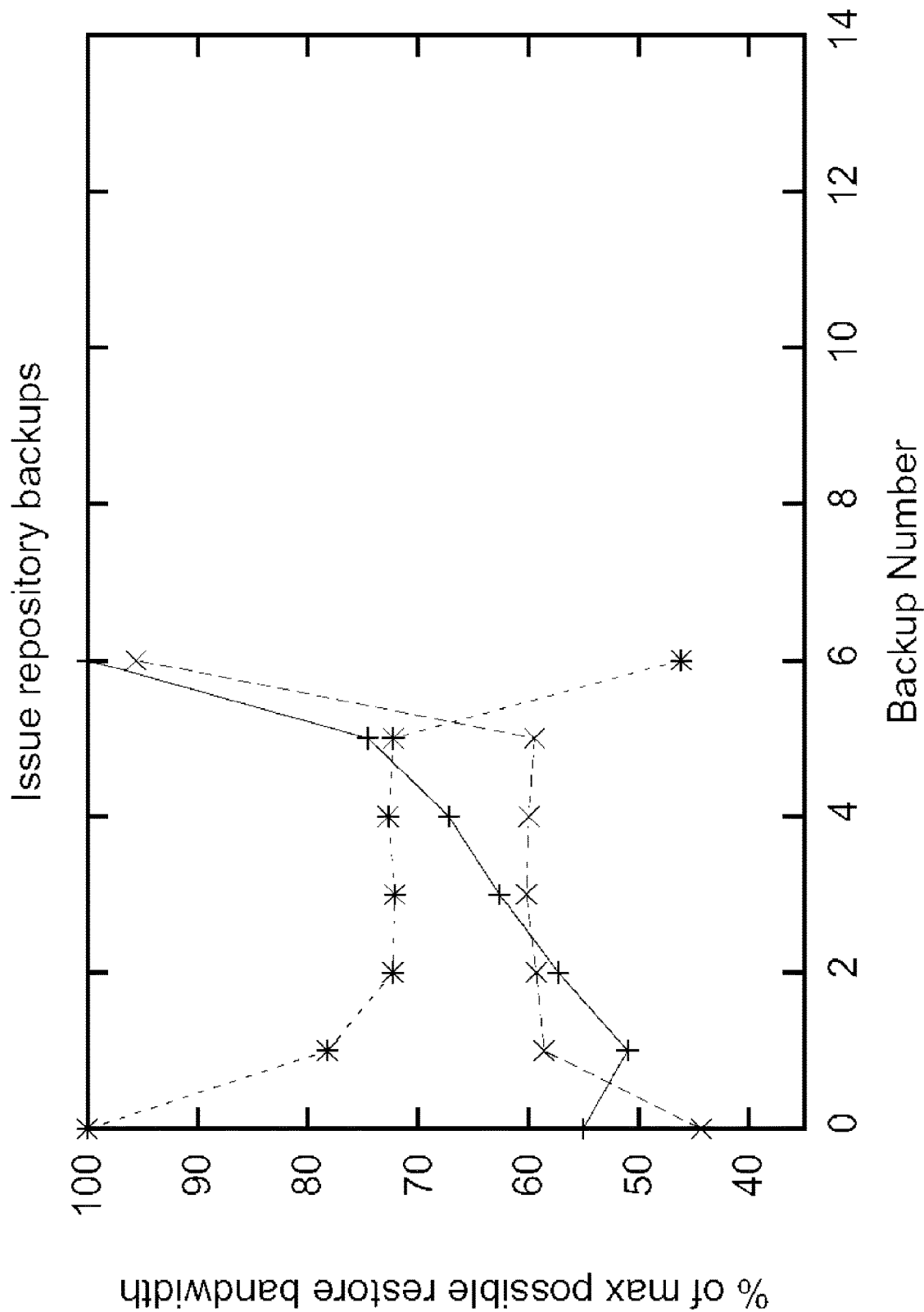
FIG. 15*b* is a view referred to in the report explained in the second exemplary embodiment of the present invention.
Figure 15C:
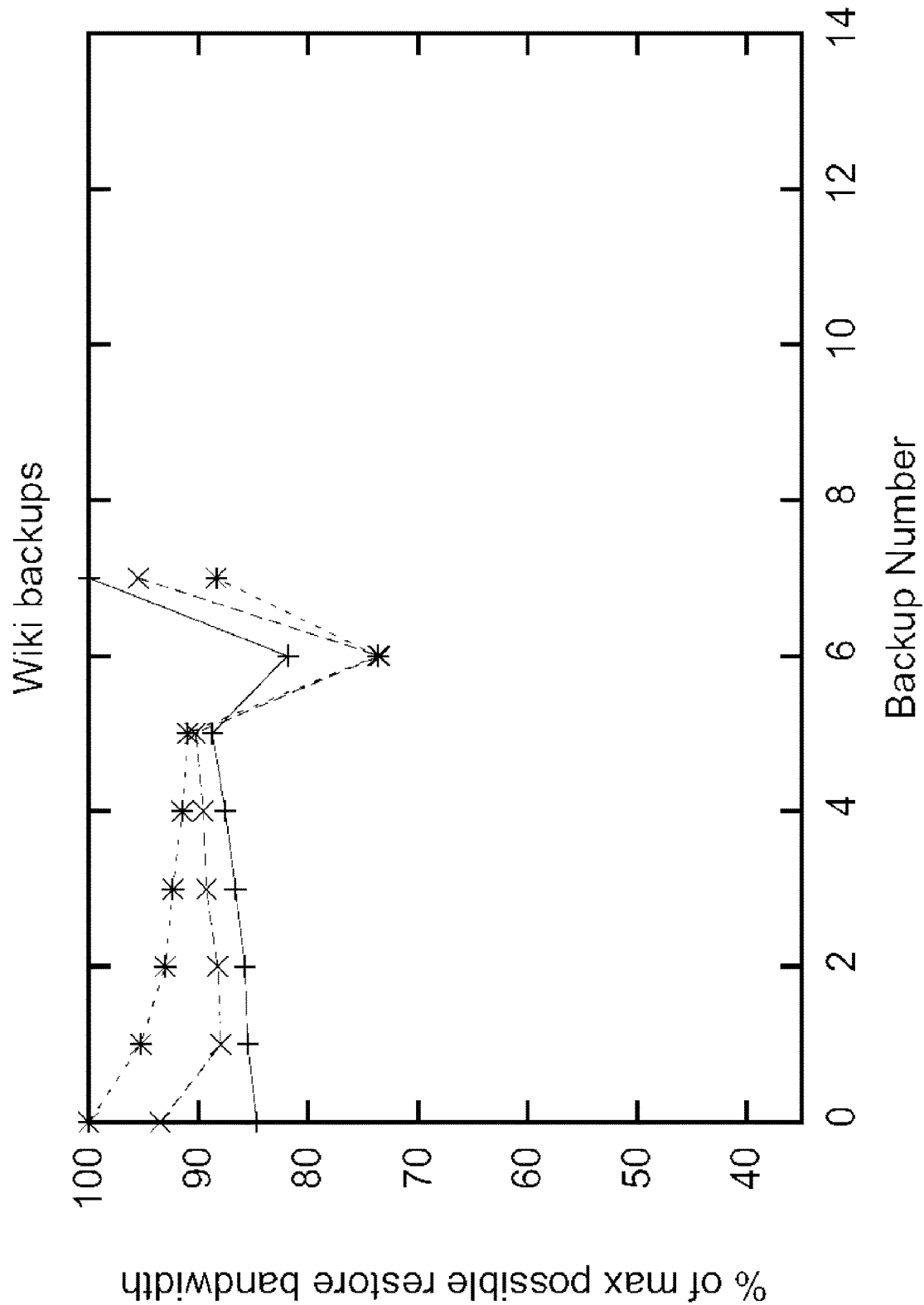
FIG. 15*c* is a view referred to in the report explained in the second exemplary embodiment of the present invention.
Figure 15D:
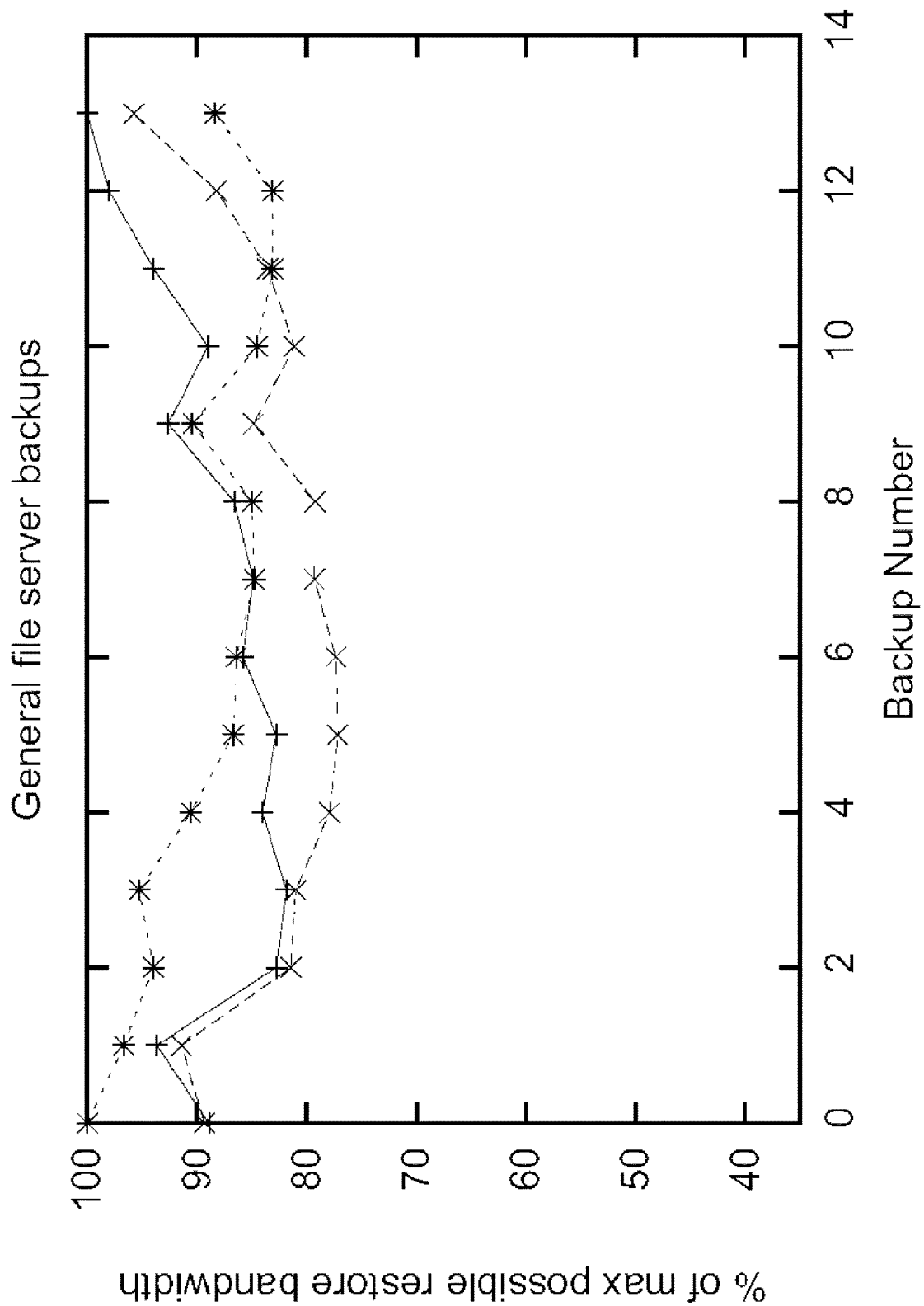
FIG. 15*d* is a view referred to in the report explained in the second exemplary embodiment of the present invention.

Our algorithm utilizes two contexts of a duplicate—its disk context and stream context. The block stream context of a data block is defined as set of blocks written in this stream immediately after this block. We define also disk context of a data block as blocks immediately following it on disk (see FIG. 12). When the intersection of these two contexts is substantial, reading of blocks in this intersection is very fast due to prefetching. In fact, this is quite often the case especially for an initial backup. (FIG. 12: Disk and stream contexts of a block)

The problem of low read bandwidth appears when the disk context contains little data from the stream context. This may happen because of deduplication, when the same block is logically present in multiple stream locations with different neighbours in each location. Such scenario occurs in the following cases:

a duplicate is present in different logical backups (global duplicate)

a duplicate is present in the same stream (internal duplicate)

a duplicate is present in one of previous versions of the same stream, for example, the same file system backed up a week before (inter-version duplicate)

In general, the most common is the last case, because of repeated backups of the same data. Moreover, the fragmentation caused by inter-version duplicates in general increase with each backup. As a result, we focus on this case in the remainder of this work. The effect of internal duplication is sometimes substantial, as discussed in Section 6.4, but usually it does not get worse with increased number of backups. In this work, for all experiments we consider the effect of fragmentation caused by internal duplication (i.e. each I/O measurement presented in this work includes this effect), but we do not focus on solving this problem.

(5.2 The Algorithm Overview)

The basic idea of the solution is to rewrite highly fragmented duplicates, i.e. blocks for which stream context in the latest backup is significantly different from their disk context established when the original copy of the block was written in some older backup. By rewriting such block we attempt to make both contexts similar. After rewriting, the new copy of the block can be used for read operations and the old copy is eventually reclaimed in the background.

We'd like to rewrite only a small fraction of blocks, because each rewrite slows down backup and consumes additional space until the old copy of the block is reclaimed. By default this parameter, called rewrite limit, is set to 5% of all blocks. This value impacts how much our algorithm slows down writing backups—see Section 6.2.3 for details.

The main loop of the algorithm looks at the next duplicated block after the current point for which we have not made a rewriting decision yet. Let's call such block the decision block. In our algorithm, we decide whether to rewrite it by comparing its current disk context with its stream context. If the common part of these two contexts is small, rewriting of the decision block gives us a lot, as we avoid one additional disk seek to read a little useful data.

In the other extreme, if the common part of the two contexts is large, such rewriting does not save us much, as the additional seek time is amortized by the time needed to read a lot of useful data. In such case we decide not to rewrite all blocks in the intersection, i.e. we leave them as duplicates. Therefore, we define a rewrite utility of a duplicate as the size of the blocks in the disk context of this block which do not belong to the stream context of such block, relative to the total size of the disk context. For example, the utility of 30% means, that 70% of blocks in the disk context appear also in the stream context. The algorithm maintains the current threshold of rewrite utility and rewrites the decision block only when its rewrite utility is not lower than this threshold.

After such decision is made, the entire process is repeated in the next iteration of the main loop for the next duplicate in the stream for which we have not made a rewriting decision yet.

Since decisions whether to rewrite duplicates are made on-line (without future knowledge), we can always make a sub-optimal choice for a given duplicate: for example by deciding to rewrite it, although such rewrite "credit" may be better saved for another duplicate later in the stream (recall, that we can rewrite not more than 5% of all blocks); or by deciding not to rewrite a duplicate with a hope that a better candidate may appear later in the stream; but such candidate may in fact never materialize in the future.

Therefore, the challenge in our algorithm is to make good rewrite decisions. For this, we maintain two rewrite thresholds: the minimal rewrite utility, and the current utility threshold.

(5.2.1 Minimal Rewrite Utility)

The minimal utility is a parameter of our algorithm and ensures that the current rewrite utility threshold never drops below it. In such way we avoid making rewrite decision which would improve restore performance only marginally. Initially, we thought that the minimal utility cannot be too high, as in such case we would not rewrite much, and cannot be too low, as in such case too much rewriting would happen. Therefore, we tested values like 20% for this threshold.

However, such value proved much too low, as it results in many rewrites issued which consume precious rewrite credits offering only marginal improvement. For example, imagine a backup in which exactly 5% of blocks are duplicates and they all have rewrite utility 20%. In such case, rewriting all duplicate blocks would improve restore performance only by about 1%. When such duplicates have all rewrite utility 50%, the gain is about 5% in such case, still not enough to justify rewriting. As a result, we selected minimal utility to be 70%. In a backup with 5% of duplicates, each with such rewrite utility, rewriting all of the duplicates improves restore performance by about 12%, which is in our opinion sufficient to justify the rewriting.

Note, that there may be backups which suffer significantly from fragmentation, but for which all duplicates have rewrite utility just below the minimal utility. However, to reduce restore bandwidth drop caused by fragmentation for such backups, we would need to rewrite many more blocks than just 5%. Fortunately, we have not encountered such case in our experiments.

(5.2.2 Current Rewrite Utility)

As explained earlier, current rewrite utility is used for each decision block to decide if rewrite should happen. This value is adjusted with each processed block. For this, we introduce best-5% set of blocks defined as the best-for-rewriting 5% of all blocks seen so far in the backup stream. Note that each rewritable block must be a duplicate, so in some cases, we may keep in this set fewer than 5% of all blocks, because there may be not enough duplicates in the stream.

To establish best-5%, we compute utility of rewriting each duplicate seen so far alone, without taking into account actual actions taken by the algorithm. In each loop of the algorithm, we set the current rewrite utility threshold to the utility of rewriting the worst of the best-5% blocks (but not below the minimal utility). Such selection roughly means, that if this threshold had been used as current utility threshold for every decision block from the beginning of the backup up to the current point, we would have rewritten the best 5% of duplicates.

(5.3 The Algorithm Details)

The algorithm presented below is performed separately on each incoming data stream. It consists of the following phases:

1. The main loop which includes context-based rewrite decision for each duplicate.
2. Background operations to reclaim old copies of rewritten blocks.

(5.3.1 The Main Loop)

The main loop of the algorithm is performed for decision block which is the next incoming block in the input stream not marked to be skipped in one of the previous loops.

1. Setting up the disk context: For the decision block, we issue a modified duplicate elimination query based on secure hash of the data (i.e. SHA-1). In case a duplicate is detected, the modified query returns the location of this block on disk, as discussed earlier. This query is issued only when it has not been already issued in one of the previous loops of this algorithm.

2. Write completion for non-duplicate: In case the decision block is not a duplicate, the standard write procedure is to be performed.

3. Reaching rewrite decision: Otherwise, the block is a duplicate and unless it is marked as to be skipped, we need to decide if it needs rewriting:

(a) Setting up the stream context: The stream context (5 MB by default) is filled by delaying the completion of the write of the decision block until enough write requests are submitted to fill in this buffer. For each write request in the stream buffer, we resolve its duplicate status by issuing a new dedup query (if we do not have such information already filled in by one of the previous loops of the algorithm).

(b) Computing the context intersection: While filling in the stream context, we check if a given block is a duplicate appearing already in the disk context of the decision block by comparing distance on disk between two blocks (note that we have disk location information for both blocks returned by dedup queries). In such way, the intersection of its disk context and its stream context is determined.

(c) Rewrite decision: As a result of the previous step, we obtain total size of all blocks in the two contexts intersection. This determines the utility of rewriting the decision block, as explained earlier. If this utility is not below the current rewrite utility threshold, the decision block is rewritten—but only this block, subject to the 5% rewrite limit (number of blocks allowed to be rewritten changes as we process more blocks, since the limit is computed based on all stream blocks seen so far). Otherwise, all blocks in the intersection are not rewritten, i.e. they are treated as duplicates in the current stream.

Note that the decision is asymmetric: rewrite only the decision block or mark all blocks in the intersection as duplicates. That is, even if the decision block is to be rewritten, we do not want to decide now to rewrite other blocks in the intersection, as they may have their context intersections big enough to avoid rewriting. However, once we decide to keep the decision block as a duplicate, we should keep the remaining blocks in the intersection as duplicates too, to ensure that the read of the decision block will fetch also these additional blocks (i.e. the rewrite utility of the decision block remains low).

(d) Marking decided blocks for skipping: All blocks in the intersection for which we decided keeping them as duplicates are marked to be skipped by future loops of this algorithm.

4. Adjusting rewrite utility threshold: Regardless of the rewrite decision, we update rewrite utility threshold to be used in the next loop iteration. Since keeping utilities of best-5% is impractical, we keep a fixed number of utility buckets (for example 10000). Each bucket is assigned disjoint equal sub-range of rewrite utilities, all buckets cover entire utility range, and each bucket keeps number of blocks seen so far which utility falls in this bucket range. With such structure we can approximate the rewrite utility of the worst of the best-5% blocks with reasonable accuracy—within range of utility assigned to each bucket.

5. Setting up the next iteration: The algorithm moves to the next block not to be skipped, adjusts the rewrite utility threshold and repeats the main loop again.

The above algorithm is repeated for all the blocks in the stream. Initially, the rewrite utility threshold is set to the minimal utility threshold. When updating, the current rewrite utility threshold never drops below this minimal value.

Note that block rewriting does not always guarantee that we increase size of the intersection of stream and disk contexts. For example, the stream context may contain duplicates only and we may decide to rewrite just one of them, because remaining are sequential. In such case, the size of the intersection is not increased, however, the rewritten block will still end up on disk close to other new or rewritten blocks. When such blocks are prefetched, they will most likely survive in read cache, reducing number I/Os needed for restore, so rewriting can be still beneficial.

(5.3.2 Background Operations)

The algorithm described above requires a background process which is able to remove the old copies of the rewritten blocks. Such task can be executed together with other maintenance tasks, which are already run from time to time like deletion, data scrubbing and data sorting. Until the maintenance task is performed, the additional space used by rewrites is occupied, temporarily reducing the deduplication ratio. As the percentage of such data is limited and the maintenance task is usually performed quite often, such solution is acceptable.

(5.3.3 Modifications to Read Operation)

If data blocks are content-addressable, both old and new copy are addressed with the same address so pointers to data blocks do not have to be changed when we replace an old copy with a new copy of the same block. To ensure good performance of the latest backup restore, we need to modify the read procedure to access the latest copy of a block.

(5.4 Discussion)

Such algorithm is clearly on-line, as we look only at blocks seen so far.

It is optimal in some cases, for example when utility of rewriting each duplicate in a stream is the same; or when such utility is decreasing with increased position of duplicates in the stream.

The worst case is when at the beginning of a stream there are many duplicates with low, but above-minimum utility of rewriting interspersed across the stream, followed later by many duplicates with high utility which are close to each other at the end of the stream. In such case, our algorithm will rewrite many low-utility duplicates and only very few (e.g. 5%) high-utility ones; whereas with future-knowledge we would have rewritten only high-utility duplicates. This case can be addressed if we adjust the minimal utility for the current backup based on statistics from the previous backup, described in section 5.5.7 below.

There is a simple modification of the CBR algorithm which seems to eliminate its cost and preserve the advantages: first identify the blocks to be rewritten, and rewrite them later off-line, after backup is finished. This does not work well however, because rewriting would require reading the fragmented blocks, which could be extremely slow (exactly because they are the most fragmented). In the on-line version of the CBR we get these blocks for free when user is writing the data.

(5.5 Algorithm Extensions)

Several extensions are possible to improve the above context-based rewriting algorithm and make it more resistant to unusual deduplication patterns.

Even though all the extensions are very important in some scenarios, we decided not to analyze them separately and instead just describe the most interesting ones below because of the limited space available.

(5.5.1 Reading Algorithm Simulation when Writing)

Each backup system may use different reading algorithm suited best to the overall design and data structures. A small component may be implemented which will simulate read algorithm during writing and suggest which blocks should not be rewritten as they would be present in system caches.

(5.5.2 Extended Stream Context)

The stream context is not only defined by the blocks which are being written after the block but also the ones written before. A special component may monitor blocks being written and keep some metadata about the ones written most recently. Such optimization will make context analysis more precise and will lower the number of rewritten blocks.

(5.5.3 Rewriting Based on Timestamp)

We should be careful to avoid too frequent rewriting for example for popular blocks like with all bits zeros, or when two filesystems are backed up at the same time and they have both some common interleaved parts (global dedup). For this, a timestamp of a block write can be used. When a block was written most recently, it will not used as candidate for rewriting which makes the threat of rewriting the same block again and again disappear.

(5.5.4 Client Stream Sorting)

This optimization is useful for systems which interleave in one disk container multiple streams being written at the same time. In such case, the best results can be achieved when the blocks of the same stream are stored together on the disk. One possible solution is to accumulate a few blocks on client and then write them together. Thanks to such solution fewer requests are sent through the network and all of them have proper size for being written together. As a result, low number of I/Os and good restore performance is assured at the expense of increased write latency.

(5.5.5 Free Space Monitoring)

The rewritten blocks consume additional space in the storage system. Even though the occupied area is very small and will be freed after short time, in some cases when the system is close to full it could cause reporting lack of space too soon. In order to prevent this problem we need to monitor the available capacity and turn off the defragmentation feature when the storage space is low.

(5.5.6 Adjustable Size Prefetch)

The base algorithm assumed fixed-size prefetch when reading from disk. Instead, we can use adjustable-size prefetch to speed up restore. The adjusting can be done based on effectiveness of recent prefetches. This would reduce the effect of fragmentation, but would not eliminate it.

(5.5.7 Adjusting Thresholds with Previous Backup Statistics)

Minimal utility can be set too high or too low. We can keep statistics of the previous backup and use it for setting minimal utility for the current backup. This obviously requires knowledge of backup boundaries by the storage system, which is not always the case.

In such approach we count (1) the number of high utility blocks which we were not able to rewrite because of not enough rewrite credit, (2) the number of issued rewrites grouped into buckets, with each bucket assigned disjoint utility range, and (3) the number of duplicates which we were not able to rewrite because its rewrite threshold was below the minimum one (also grouped by buckets).

The minimal utility was set too low if the first number was substantially greater than zero, in such case we need to increase this threshold. Otherwise, if we have not exhausted the rewrite credit and the third number was non-zero, we need to lower the threshold (but not below some absolute minimum, below which rewriting does not make sense). The size of increase or decrease is determined by the appropriate bucket sizes and their associated ranges, in such a way that we use all rewrite credits and rewrite duplicates with maximum utility assuming the current backup is similar to the previous one. Note that such adjustments are based on heuristics only and are not guaranteed to work, but should work well in the common case.

<6 Experimental Methodology>

(6.1 Description of Chosen Data Sets)

We have used 4 sets of backup traces to evaluate the effect of fragmentation and effectiveness of our algorithm.

Development project backups—7 weekly backups of a large C++ project (about 14 GB each)

Issue repository backups—7 weekly backups of an issue repository used for reporting and following issues related to a software product (about 18 GB each)

Wiki backups—8 weekly backups of wiki used by a commercial company (about 9 GB each)

General file server backups—14 weekly backups of home directories from an IT research laboratory (about 78 GB each)

(6.2 Base Model)

The simulated storage system environment is quite simple and relies on the following main assumptions:

the system is empty at the beginning of each measurement, the storage space for backup is continuous (something like a one large disk), only one user filesystem/directory is backed up into the system (the current version of it every week), the chunking is done with variable block size of expected size 8 KB produced by the Rabin fingerprinting.

With the above assumptions, we give the priority to evaluate the severity of the problem and efficiency of its solution without obscuring the experiments with too many details which exists in today's backup systems.

(6.2.1 Simulating Read Algorithm)

We simulated a simple read algorithm, with constant prefetch size of 2 MB and dedicated LRU read cache of 512 MB. The cache size was selected to keep only a small fraction of each backup (at most 6%). Selection of prefetch size is explained in Section 7.3.

(6.2.2 Stream Context Size)

We use 5 MB as stream context size, because it is big enough to allow our algorithm to be effective and small enough so increase in write latency due to filling this context is small. Today backup systems easily achieve 200 MB/s for a single stream, so it will take only 25 ms to fill in stream context. Note that most of the duplicate blocks will be released as soon as their context is found (usually after a few milliseconds) and the full 25 ms will be taken only by blocks to be rewritten (about 5% of all blocks) and non duplicates which already have significant latency. We experimented with bigger stream context sizes, but they did not improve effectiveness of defragmentation much. The one noticeable effect was however further reduction in number of duplicates rewritten.

(6.2.3 Cost of Rewriting)

When evaluating the cost of our solution, we need to estimate how much we slow down the backup because of rewrites. We have modified the write path of a commercial backup system HYDRAstor to avoid checking for duplicates and compared bandwidth of such solution to the bandwidth of unmodified system when writing 100% of duplicates. As a result, the latter was 3 times bigger than the former. Based on this result, we use factor of 3 slowdown for writing a block vs. deduplicating it. That is, for example 5% blocks rewritten cause up to 15% slowdown. Since all rewritten blocks are duplicates, the actual slowdown depends on percentage of duplicates in the original stream—the higher the percentage, the higher the slowdown, and 15% slowdown is achieved when all blocks in the stream are duplicates.

(6.3 Omitted Factors)

To keep the analysis simple, we disregarded some factors:

global deduplication—as mentioned earlier, fragmentation caused by global duplicates is not a focus of our work.

low-level placement of data on disk—the actual data fragmentation in the storage system is actually greater than in our model because of how data is stored on disk. We disregarded this factor, because we want to study impact of fragmentation caused by deduplication only.

many disk drives/servers—if our restore can use bandwidth of all available disks, the fragmentation problem in systems with many disks is at least as serious as with one disk only. On the other hand, if we need only limited-bandwidth restore, availability of multiple disks reduces such severity, because we have many spindles to perform seeks and such seeks will not necessarily lower the restore performance.

In this work we assume the former case, so it is sufficient to study fragmentation with one disk only.

(6.4 Internal Stream Duplication)

Internal stream duplication—when a block appears more than once in the current backup stream—can impact the restore bandwidth in two very different ways:

positively—when the duplicate data is already in the cache and disk operation is not needed to read it, negatively—when the data was already evicted from the cache. In such case downloading it from disk again may cause reading old disk context, much different than current stream context. Such data will be put into cache but may be never used in the future (apart from the requested block).

In our traces, internal duplication occurs at relatively high rates—see FIG. 13. As a result, these effects were sometimes clearly visible; from 47% reduction of the restore bandwidth of the initial backup to 12% increase. (FIG. 13: Data sets characteristics (*-data excluding first backup))

The effect of internal duplication on restore speed adjusted our base-level performance we compare our solution against. Clearly, internal fragmentation remains a problem and needs to be addressed, but it is outside of focus of our work. Some possible options to address internal fragmentation is caching the data in more intelligent way and duplicating data on the disk for better performance.

<7 Evaluation>

(7.1 Meeting the Requirements)

The CBR algorithm presented above optimizes future read bandwidth of the latest stream, as illustrated by FIG. 15a-15d. Defragmentation with our algorithm is very effective for all traces, because the resulting restore bandwidth of the latest backup is within a few percent of the optimal restore which is achieved after complete defragmentation (for example by off-line deduplication). Without defragmentation, bandwidth of restore from the latest backup with in-line dedup is below 50% of the optimal for the issue repository backup; and 85%-88% for other backup sets.

FIG. 15a-15d: Restore speeds of 3 cases: (1) after CBR defragmentation, (2) in-line dedup without defragmentation and (3) off-line dedup; normalized to 100 which is speed of each backup restore without inter-version fragmentation.

Assuming eliminating duplicates immediately is three times faster than writing duplicates as new blocks, and since we rewrite not more than 5% of all blocks, the CBR ensures, that the write bandwidth is reduced by not more than 15%. As seen in FIG. 14, our algorithm actually rewrites much lower percentage of all blocks than the target 5%. This is because we are very conservative since our minimal rewrite utility is set high at 70% and we always observe the 5% limit while processing backup streams. As a result, our algorithm reduces write bandwidth by only 1%-5% (see write time increase column in FIG. 14). (FIG. 14: Impact of CBR defragmentation on the last backup of each backup set. Optimal bandwidth of restore without inter-version fragmentation normalized to 100.)

Our algorithm does not use additional space except for rewritten duplicated blocks, so the CBR also guarantees, that the additional space consumption is below 5% of all blocks. Actual number is much lower—between 0.52% and 2.61%. Old copies of the blocks are removed in the background for example as part of deletion process running periodically, so this space consumption is temporary.

Additional disk bandwidth consumption is also limited to writing rewritten blocks. The algorithm is also easily tunable by setting the percent of blocks to be rewritten. The higher the percentage, the better restore performance at the expense of bigger drop in write performance and more disk space required for storing temporarily old copies of the rewritten blocks.

(7.2 Setting Rewrite Limit)

Figure 16:
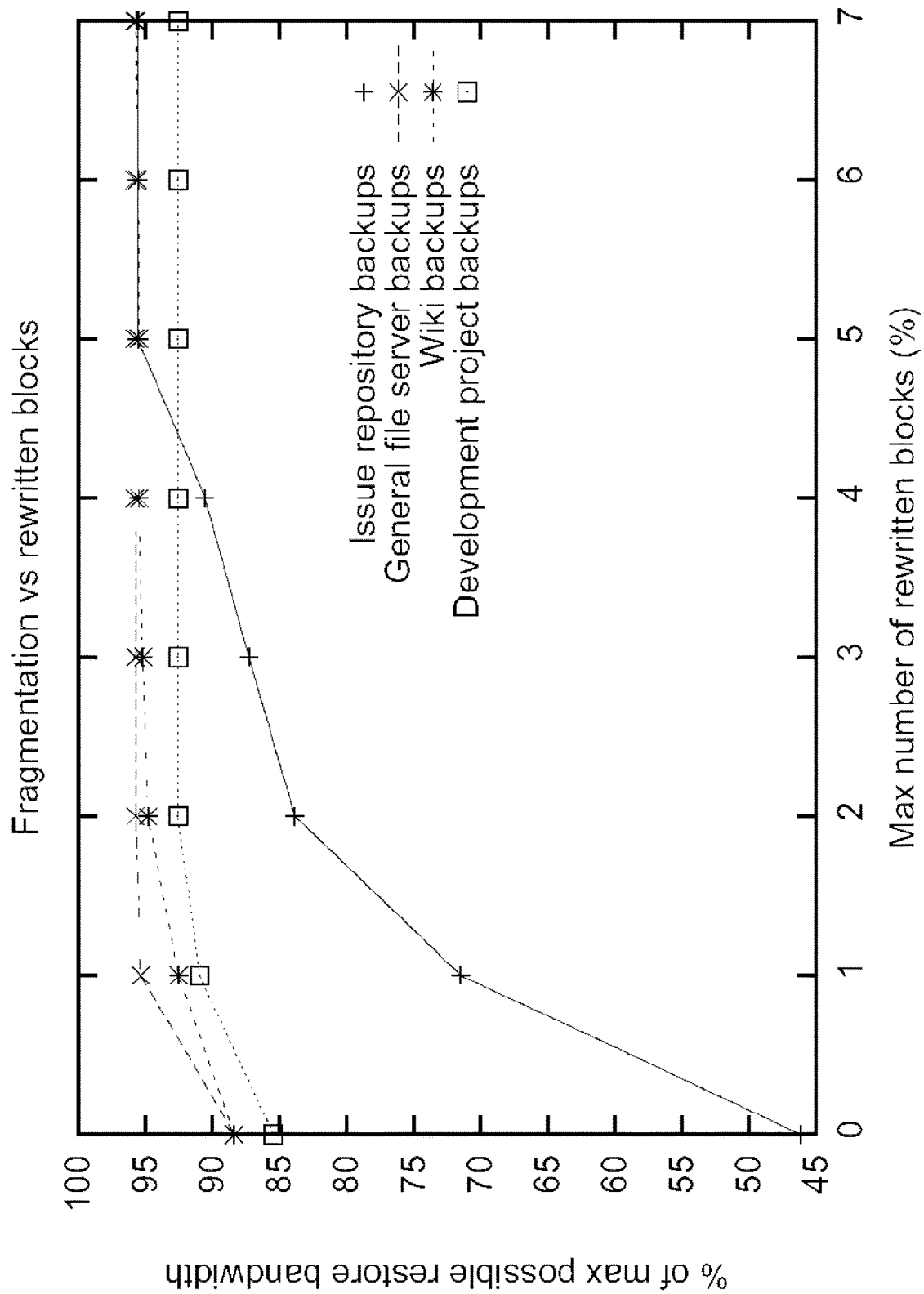
FIG. 16 is a view referred to in the report explained in the second exemplary embodiment of the present invention.

To select the best value for the rewrite limit, we performed a series of experiments varying this limit form 1% to 7% while keeping the minimal rewrite utility unchanged at 70%. The results for the latest backup in each backup set are given in FIG. 16. Setting this limit to low values like 2% or even 1% works well for all sets except issue repository, for which the rewrite limit of 5% offers the lowest reduction in restore bandwidth. Increasing this limit beyond 5% does not give us anything, so we decided to set this limit to 5% for all experiments. (FIG. 16: Impact of rewrite limit on restore bandwidth.)

(7.3 Disk Context/Prefetch Size)

Figure 17:
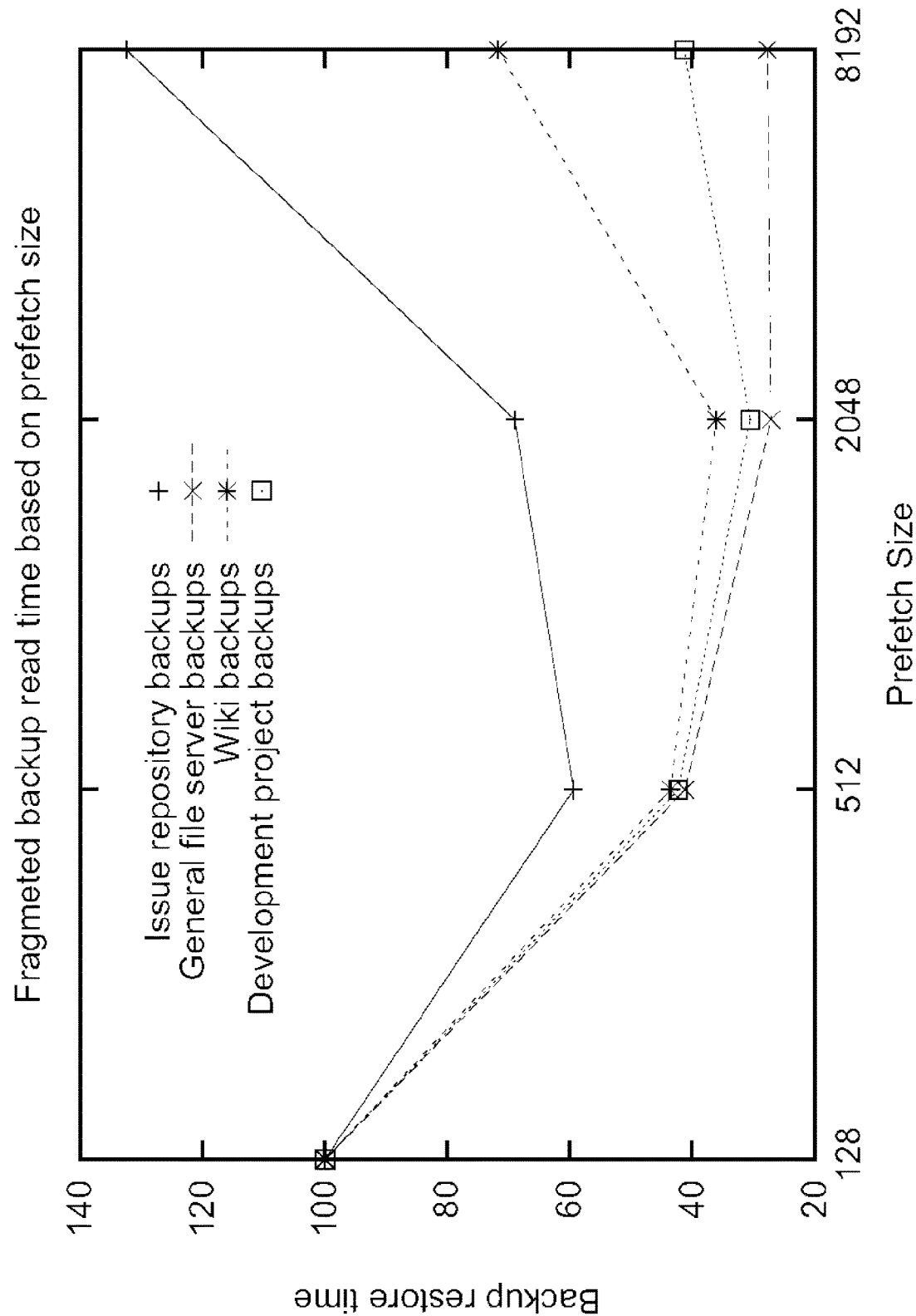
FIG. 17 is a view referred to in the report explained in the second exemplary embodiment of the present invention.

For reading data which is continuous on disk, bigger prefetch size is generally better. As FIG. 17 shows, this is not true for fragmented data. (FIG. 17: Relative read time of the latest backup for each backup set, before defragmentation, as a function of prefetch size.)

Here, in almost all cases, the best fixed size prefetch is 2 MB. One exception is issue repository backup, for which 512 KB prefetch is better. Since we compare here using different prefetch sizes, extrapolation of performance based on number of I/Os only cannot be done. Instead, we assume standard disk characteristics to be able to reason about achieved performance.

Based on those results we decided to use 2 MB prefetch for the system with the CBR algorithm. Note that it is possible that with context-based rewriting some other prefetch size is better, so our estimation of efficiency of this algorithm is conservative for all sets except issue repository. We have done so because we extrapolate performance based on number of I/Os, and with different prefetch sizes it would be not possible without additional assumptions.

Since for the issue repository backup set, the best tested prefetch size is 512 KB, we simulated both a system with and without the CBR algorithm using this prefetch size. In such case, the fragmentation caused restore performance drop of 25% (instead of 45% for 2 MB prefetch). However, the CBR algorithm was still able to reduce this drop to about 5%. The CBR with 2 MB prefetch size also reduced this drop, but to 12% (note that 100% here corresponds to the restore bandwidth achieved with 512 KB prefetch when no inter-version fragmentation is present).

(7.4 Effect of Compression)

So far we have assumed that the backup data is not compressible. If we keep the prefetch size constant and equal to 2 MB, the compressible data results in fragmentation problem magnitude increased and the CBR algorithm delivering even better relative improvements in restore bandwidth. For example, for 50% compressible data, the drop in restore performance increases from 12-55% to 15-65%, whereas the CBR defragmentation reduces this drop to 3-6% (instead of 4-7% without compression). Obviously, selecting different prefetch size based for example on compressibility of data could change these results, but we assume one fixed prefetch size for all types of data (and optimized for incompressible data).

(7.5 Potentially Unnecessary Rewrites)

With future knowledge, some of the rewrites may be not necessary, because blocks in the disk context of the decision block which are not in its stream context, in fact may appear later in the stream. To estimate how many such rewrites occur, we extend stream context size form the standard 5 MB to a variable size spanning from the current location in the stream till the end of the stream.

We define a rewrite as potentially unnecessary, when the rewrite utility of the decision block computed with such extended stream context is below the minimal rewrite utility. It turns out that the fraction of potentially unnecessary rewrites is relatively high, 30-44% for the latest backup, depending on a backup set. We can avoid some of these rewrites by increasing the standard stream context size. For example, increasing it from 5 MB to 20 MB reduces this fraction to 22-37%. Although these fractions are high, we still rewrite a very small fraction of all stream blocks, even with these potentially unnecessary rewrites included.

(8 Related Work)

As explained earlier, the fragmentation is a necessary evil of deduplication. The simplest solution is postprocess deduplication, which eliminates defragmentation, but has a few other serious problems, discussed in Section 8.1. Some vendors, like EMC try to fight the fragmentation with time and resource consuming housekeeping processes. The description of this process has not been published, but one possible approach is to selectively rewrite subset of duplicates in the background, i.e. in a way similar to our CBR approach, but done off-line. More on such algorithm is given in Section 8.2. Other systems like HYDRAstor use bigger block size—64 KB block—which reduces the severity of the fragmentation problem, but at the expense of reduced deduplication ratio.

(8.1 Eliminating Fragmentation with Offline Deduplication)

One simple solution which satisfies some of the requirements above is already present on the market and it is called off-line deduplication. In its simplest form, all data from the current backup are stored continuously on disk, and the deduplication is done in the background in such a way that the blocks from the latest backup are a base for eliminating duplicates from older backups. As a result, the currently written stream has no fragmentation and older backups are fragmented proportionally to their age. Even though the algorithm was most probably not designed to deal with fragmentation, it is very effective for eliminating it in recent backups.

Unfortunately, such approach suffers from many other problems, the one fatal is low write bandwidth, as explained earlier in Section 1. The percentage of duplicates in a backup vary depending on data patterns, but usually this ratio is much higher than 75%, as little data is modified between backups. As explained in section 6.2.3, deduplication without writing the data can be 3 times faster than writing the data first and then deduplicating it in the background. Assuming very conservatively that a backup stream contains 75% of duplicates, using off-line deduplication results in backup window more than 70% larger, compared to writing this backup to a system with in-line dedup. This is clearly not acceptable, as backup window usually cannot be extended much if at all.

(8.2 Comparison of Defragmentation Solutions)

Beyond off-line deduplication and the CBR done online, there is at least one more option to perform the context-based rewriting in the background, i.e. off-line, mention already in Section 5.4. Such solution does not affect backup writing at all, but it will require rewriting many more blocks than the on-line approach, as we would have to rewrite substantial part of stream context of duplicates causing fragmentation. Therefore the main flaws of this approach include resources needed to read the fragmented data and rewrite selected blocks again in the background, and low read bandwidth of restore attempted before block rewriting is completed.

The comparison of all mentioned alternatives is presented in FIG. 18. We note here that storage consumption of both off-line options can be improved by staging, i.e. by running the process of removing the duplicates (or rewriting some of them) in parallel but little behind the process of backup writing. Staging however requires more resources like available disk bandwidth and spindles. (FIG. 18: Comparison of defragmentation solutions.)

(8.3 Remaining Related Work)

In general, there are not many papers about the problem of data fragmentation even though it is known for some time already.

A few papers addressed the problem of improving metadata read for faster duplicate elimination. The work by Zhu et al. describes solution with Bloom Filter and stream-oriented metadata prefetch, whereas Lillibridge et al. argues that solution with sparse indexing (eliminating duplicates only within previously selected few large segments) is better due to smaller memory consumption. Additional hardware like SSD can be used to eliminate random duplicates. Such solutions will make the fragmentation problem even harder, as more fine-grained duplicates can be detected. Additionally, none of the above approaches solves the problem of reading the fragmented data and in all cases fragmentation increases with subsequent backups.

If we relax the requirement on defragmentation solution of not degrading deduplication effectiveness, we can try to eliminate duplicates only within a subset of data, therefore potentially reducing fragmentation. Besides sparse indexing, such approach is possible with extreme binning, ProtectTier, subchunk deduplication, and with multinode systems restricting dedup to one or a subset of nodes like Pastiche and Data-Domain global extension. Unfortunately, even if we consider very few (2-3) segments of previous backups to deduplicate the current segment against (like in sparse indexing), those segments may already be not continuous on disk, because they may contain also duplicates from other, older segments.

Finally, we can reduce or even eliminate fragmentation by eliminating duplicates with large blocks or objects. In early versions of EMC Centera, the unit of deduplication was entire file, which worked well for Centera's target market, i.e. archiving, but is not the right solution for backups, because of low deduplication effectiveness.

<9 Conclusions and Future Work>

In this work we have described data fragmentation in storage systems with in-line deduplication and quantified impact of fragmentation caused by inter-version deduplication on restore performance. The problem is quite severe, and depending on backup characteristics may result in restore speed drop of more than 50%, as verified by experiments driven by set of real backup traces, with 7-14 backups in each backup set. For larger sets, with backups spanning many months or even years, we expect this problem to be even bigger. Moreover, this problem affects latest backups the most, which are most likely used for restore.

To deal with the problem, we have proposed the context-based rewriting algorithm which rewrites selected few duplicates (not more than 5% of all blocks). The presented algorithm improves restore speed of the latest backups, while resulting in fragmentation increased for older backups, which are rarely used for restore. Old copies of the rewritten blocks are removed in the background, for example during periodic deletion and space reclamation process which is already required in storage systems with deduplication.

Our trace-driven simulation experiments have shown that rewriting a few selected blocks reduces write performance a little, but practically eliminates the restore speed reduction for the latest backup (within 4-7% of the optimal bandwidth).

For future work, we plan to investigate impact of deletion on fragmentation, letting the CBR algorithm be less conservative (allowing it to exceed temporarily the desired fraction of rewritten blocks), and investigate the impact of algorithm extensions on its effectiveness. Moreover, we plan to evaluate the proposed solution in a commercial backup system.

One important issue to be investigated in the future is also how to deal effectively with fragmentation caused by internal duplication. Our experiments have shown that for some backups this fragmentation causes slowdown in restore similar to the one caused by duplication across multiple backup streams in one backup set.

This paper concentrates on fragmentation caused by one logical stream written in different versions every week. Even though this is the dominant case, two more sources of the problem are still to be examined. Both internal duplicate elimination and global deduplication between different backup sets may lead to the problems with read bandwidth. Solving them would make another step in critical restore optimization.

<Supplementary Notes>

Figure 19:
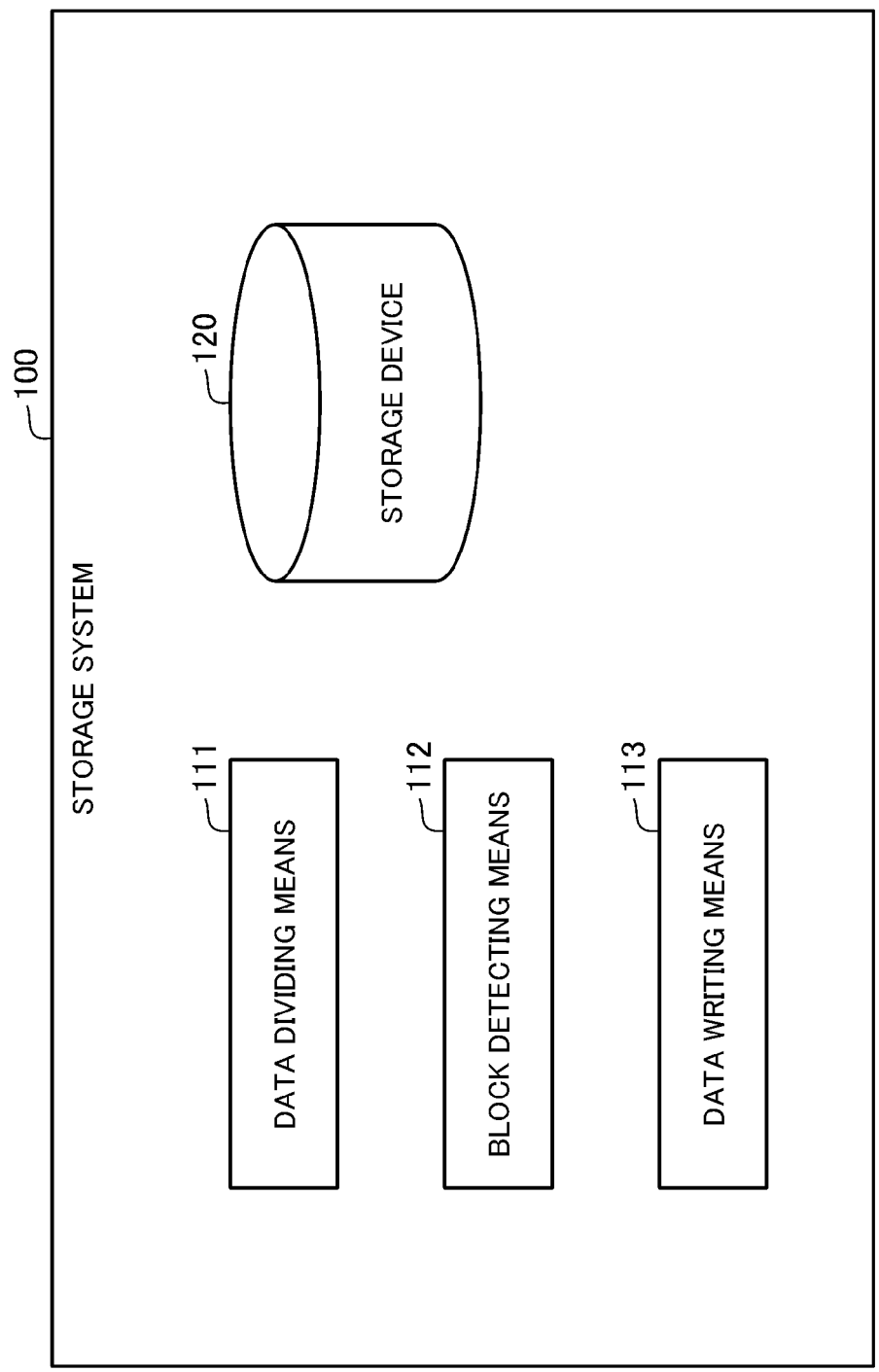
FIG. 19 is a block diagram showing a configuration of a storage system according to supplementary note 1 of the present invention.

The whole or part of the exemplary embodiments disclosed above can be described as the following supplementary notes. Outlines of the configurations of a storage system (refer to FIG. 19), a program, and an information processing method according to the present invention will be described below. However, the present invention is not limited to the configurations described below.

(Supplementary Note 1)

A storage system 100, comprising:

a data dividing means 111 for dividing write target data into a plurality of block data;

a block detecting means 112 for checking whether the respective block data obtained by division by the data dividing means are already stored in a storage device 120; and a data writing means 113 for storing the respective block data obtained by division by the data dividing means into the storage device and, when storing other block data of a same content as block data already stored in the storage device, causing to refer to the block data already stored in the storage device as the other block data, wherein:

the block detecting means 112 is configured to detect a share rate representing a rate of a shared portion between a plurality of consecutive block data configuring a predetermined range in the write target data among the block data obtained by division by the data dividing means and a plurality of block data in a predetermined range already stored consecutively in the storage device; and the data writing means 113 is configured to, depending on the share rate detected by the block detecting means, newly store the block data obtained by division by the data dividing means, into the storage device.

(Supplementary Note 2)

The storage system according to Supplementary Note 1, wherein:

the block detecting means is configured to, in a case of having detected that specific block data of the block data obtained by division by the data dividing means has already been stored in the storage device, detect the share rate between a plurality of block data consecutive from the specific block data configuring a predetermined range in the write target data and a plurality of block data in a predetermined range consecutive from block data of a same content as the specific block data already stored in the storage device; and the data writing means is configured to newly store the specific block data into the storage device depending on the share rate detected by the block detecting means.

(Supplementary Note 3)

The storage system according to Supplementary Note 1 or 2, wherein the block detecting means is configured to detect, as the share rate, a ratio that each of the plurality of consecutive block data configuring the predetermined range in the write target data among the block data obtained by division by the data dividing means is identical, regardless of a sequence of the plurality of consecutive block data, with each of the plurality of block data in the predetermined range already stored consecutively in the storage device.

(Supplementary Note 4)

The storage system according to any of Supplementary Notes 1 to 3, wherein the data writing means is configured to, in a case that the share rate detected by the block detecting means is equal to or less than a previously set value, newly store the block data obtained by division by the data dividing means, into the storage device.

(Supplementary Note 5)

The storage system according to any of Supplementary Notes 1 to 4, wherein the data writing means is configured to set so that a volume of the block data newly stored into the storage device depending on the share rate detected by the block detecting means becomes equal to or less than a predetermined volume.

(Supplementary Note 6)

The storage system according to any of Supplementary Notes 1 to 4, wherein the data writing means is configured to set so that a ratio of a volume of rewrite block data, which is the block data newly stored into the storage device depending on the share rate detected by the block detecting means, to a volume of data already stored in the storage device among the write target data becomes equal to or less than a previously set ratio.

(Supplementary Note 7)

The storage system according to Supplementary Note 6, wherein the data writing means is configured to set so that the ratio of the volume of the rewrite block data to the volume of the data already stored in the storage device among the write target data becomes equal to or less than 5%.

(Supplementary Note 8)

A computer program comprising instructions for causing an information processing device to realize:

a data dividing means for dividing write target data into a plurality of block data;

a block detecting means for checking whether the respective block data obtained by division by the data dividing means are already stored in a storage device; and a data writing means for storing the respective block data obtained by division by the data dividing means into the storage device and, when storing other block data of a same content as block data already stored in the storage device, causing to refer to the block data already stored in the storage device as the other block data, wherein:

the block detecting means is configured to detect a share rate representing a rate of a shared portion between a plurality of consecutive block data configuring a predetermined range in the write target data among the block data obtained by division by the data dividing means and a plurality of block data in a predetermined range already stored consecutively in the storage device; and the data writing means is configured to, depending on the share rate detected by the block detecting means, newly store the block data obtained by division by the data dividing means, into the storage device.

(Supplementary Note 9)

The computer program according to Supplementary Note 8, wherein: the block detecting means is configured to, in a case of having detected that specific block data of the block data obtained by division by the data dividing means has already been stored in the storage device, detect the share rate between a plurality of block data consecutive from the specific block data configuring a predetermined range in the write target data and a plurality of block data in a predetermined range consecutive from block data of a same content as the specific block data already stored in the storage device; and the data writing means is configured to newly store the specific block data into the storage device depending on the share rate detected by the block detecting means.

(Supplementary Note 10)

The computer program according to Supplementary Note 8 or 9, wherein the data writing means is configured to set so that a ratio of a volume of rewrite block data, which is the block data newly stored into the storage device depending on the share rate detected by the block detecting means, to a volume of data already stored in the storage device among the write target data becomes equal to or less than a previously set ratio.

(Supplementary Note 11)

An information processing method, comprising:
dividing write target data into a plurality of block data;
checking whether the respective block data obtained by division are already stored in a storage device; and
storing the respective block data obtained by division into the storage device and, when storing other block data of a same content as block data already stored in the storage device, writing data by causing to refer to the block data already stored in the storage device as the other block data, the information processing method, further comprising:
after dividing the write target data into the block data, detecting a share rate representing a rate of a shared portion between a plurality of consecutive block data configuring a predetermined range in the write target data among the block data obtained by division and a plurality of block data in a predetermined range already stored consecutively in the storage device; and
depending on the detected share rate, newly storing the block data obtained by division, into the storage device.

(Supplementary Note 12)

The information processing method according to Supplementary Note 11, further comprising:
after dividing the write target data into the block data, in a case of having detected that specific block data of the block data obtained by division has already been stored in the storage device, detecting the share rate between a plurality of block data consecutive from the specific block data configuring a predetermined range in the write target data and a plurality of block data in a predetermined range consecutive from block data of a same content as the specific block data already stored in the storage device; and
newly storing the specific block data into the storage device depending on the detected share rate.

(Supplementary Note 13)

The information processing method according to Supplementary Note 11 or 12, further comprising setting so that a ratio of a volume of rewrite block data, which is the block data newly stored into the storage device depending on the share rate detected by the block detecting means, to a volume of data already stored in the storage device among the write target data becomes equal to or less than a previously set ratio.

The abovementioned program is stored in a storage device, or recorded on a computer-readable recording medium. For example, the recording medium is a portable medium such as a flexible disk, an optical disk, a magneto-optical disk and a semiconductor memory.

Although the present invention has been described with reference to the exemplary embodiments and supplementary notes described above, the present invention is not limited to the above exemplary embodiments. The configurations and details of the present invention can be altered in various manners that can be understood by those skilled in the art within the scope of the present invention.

DESCRIPTION OF REFERENCE NUMERALS 1 storage system
2 accelerator note
3 storage node
4 backup system
5 backup target device
11 data dividing part
12 block detecting part
13 data writing part
14 data retrieving part
20 storage device
100 storage system
111 data dividing means
112 block detecting means
113 data writing means
120 storage device

The invention claimed is:

1. A storage system, comprising:
a processor;
a data dividing unit implemented on the processor for dividing write target data into a plurality of block data;
a block detecting unit implemented on the processor for checking whether the respective block data, obtained from the data dividing unit, are already stored in a storage device; and
a data writing unit implemented on the processor for storing the respective block data, obtained from the data dividing unit, into the storage device, and also storing duplicated block data by referring to the block data already stored in the storage device, wherein:
the block detecting unit is configured to, when detecting that specific block data obtained from the data dividing unit is already stored in the storage device, detect a share rate representing a rate of a shared portion between a plurality of block data arranged consecutively from the specific block data in the write target data unit and a plurality of block data arranged consecutively from the specific block data already stored in the storage device; and
the data writing unit is configured to, depending on the share rate detected by the block detecting unit, newly store the specific block data obtained from the data dividing unit, into the storage device.

2. The storage system according to claim 1, wherein the block detecting unit is configured to detect, as the share rate, a ratio that each of the plurality of block data arranged consecutively in the write target data among the block data obtained from the data dividing unit, is identical, regardless of a sequence of the plurality of block data arranged consecutively, with each of the plurality of block data already stored consecutively in the storage device.

3. The storage system according to claim 1, wherein the data writing unit is configured to, in a case that the share rate detected by the block detecting unit is equal to or less than a previously set value, newly store the block data, obtained from the data dividing unit, into the storage device.

4. The storage system according to claim 1, wherein the data writing unit is configured to set so that a volume of the block data newly stored into the storage device depending on the share rate detected by the block detecting unit becomes equal to or less than a predetermined volume.

5. The storage system according to claim 1, wherein the data writing unit is configured to set so that a ratio of a volume of rewrite block data, which is the block data newly stored into the storage device depending on the share rate detected by the block detecting unit, to a volume of data already stored in the storage device among the write target data becomes equal to or less than a previously set ratio.

6. The storage system according to claim 5, wherein the data writing unit is configured to set so that the ratio of the volume of the data already stored in the storage device among the rewrite block data to the volume of the write target data becomes equal to or less than 5%.

7. A computer program stored in a non-transitory computer-readable medium comprising instructions for causing a processor to realize:
- a data dividing unit implemented on the processor for dividing write target data into a plurality of block data;
- a block detecting unit implemented on the processor for checking whether the respective block data, obtained from the data dividing unit, are already stored in a storage device; and
- a data writing unit implemented on the processor for storing the respective block data, obtained from the data dividing unit, into the storage device, and also storing duplicated block data by referring to the block data already stored in the storage device, wherein:
- the block detecting unit is configured to, when detecting that specific block data, obtained from the data dividing unit, is already stored in the storage device, detect a share rate representing a rate of a shared portion between a plurality of block data arranged consecutively from the specific block data in the write target data and a plurality of block data arranged consecutively from the specific block data already stored in the storage device; and
- the data writing unit is configured to, depending on the share rate detected by the block detecting unit, newly store the specific block data, obtained from the data dividing unit, into the storage device.

8. The computer program according to claim 7, wherein the data writing unit is configured to set so that a ratio of a volume of rewrite block data, which is the block data newly stored into the storage device depending on the share rate detected by the block detecting unit, to a volume of data already stored in the storage device among the write target data becomes equal to or less than a previously set ratio.

9. An information processing method, comprising:
- dividing write target data into a plurality of block data;
- checking whether the respective block data, obtained by division, are already stored in a storage device; and
- storing the respective block data, obtained by division, into the storage device, and also storing duplicated block data preferring to the block data already stored in the storage device, the information processing method, further comprising:
- after dividing the write target data into the block data, when detecting that specific block data, obtained by division, is already stored in the storage device, detecting a share rate representing a rate of a shared portion between a plurality of block data arranged consecutively from the specific block data in the write target data and a plurality of consecutive block data arranged consecutively from the specific block data already stored in the storage device; and
- depending on the detected share rate, newly storing the specific block data obtained by division, into the storage device.

10. The information processing method according to claim 9, further comprising setting so that a ratio of a volume of rewrite block data, which is the block data newly stored into the storage device depending on the detected share rate, to a volume of data already stored in the storage device among the write target data becomes equal to or less than a previously set ratio.

* * * * *